US006579938B2

(12) United States Patent
Bellinger et al.

(10) Patent No.: US 6,579,938 B2
(45) Date of Patent: Jun. 17, 2003

(54) POLYAMIDE-IONOMER GRAFT COPOLYMER AND BLENDS THEREOF FOR USE IN GOLF BALL COVERS OR MANTLES

(75) Inventors: Michelle A. Bellinger, West Hartford, CT (US); Michael J. Sullivan, Barrington, RI (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 48 days.

(21) Appl. No.: 09/734,294

(22) Filed: Dec. 11, 2000

(65) Prior Publication Data

US 2001/0012873 A1 Aug. 9, 2001

Related U.S. Application Data

(60) Continuation-in-part of application No. 09/523,563, filed on Mar. 10, 2000, now Pat. No. 6,384,140, which is a continuation-in-part of application No. 09/241,186, filed on Feb. 1, 1999, now Pat. No. 6,380,310, which is a division of application No. 08/763,070, filed on Dec. 10, 1996, now Pat. No. 5,886,103.

(51) Int. Cl.[7] .......................... A63B 37/12; A63B 37/02; C08L 77/00
(52) U.S. Cl. ..................... 525/69; 525/179; 525/183; 473/372; 473/373; 473/385
(58) Field of Search .................... 525/69, 179, 183; 473/372, 373, 385

(56) References Cited

U.S. PATENT DOCUMENTS

| | | | | |
|---|---|---|---|---|
| 4,264,075 A | * | 4/1981 | Miller | |
| 5,542,677 A | * | 8/1996 | Sullivan | |
| 5,569,712 A | * | 10/1996 | Wang | |
| 5,713,802 A | * | 2/1998 | Moriyama | |
| 5,730,663 A | * | 3/1998 | Tanaka | |

FOREIGN PATENT DOCUMENTS

| | | | |
|---|---|---|---|
| JP | 59-157122 | * | 9/1984 |
| JP | 60-060867 | * | 4/1985 |
| JP | 62-022 841 | * | 1/1987 |
| JP | 06-192512 | * | 7/1994 |
| WO | WO 98/40127 | | 9/1998 |

* cited by examiner

Primary Examiner—David J. Buttner

(57) ABSTRACT

Disclosed herein is a golf ball with a cover or mantle, or both, formed from a composition comprising a polyamide-ionomer graft copolymer and a method of making the same. Polyamide-ionomer graft copolymers include a polyamide component and an ionomeric component. In a preferred form, polyamide-ionomer graft copolymers have a polyamide component backbone and ionomeric components grafted thereto. Golf balls according to the invention may also be formed from a composition or material that includes a blend of a polyamide-ionomer graft copolymer and an ionomer. Such blends are preferably employed as a mantle or a cover of a golf ball. The cover composition has excellent durability and resistance to cracking, even at cold temperatures. Materials comprising polyamide-ionomer graft copolymer are a useful substitute for an ionomer golf ball cover, particularly when a low spin golf ball is desired.

12 Claims, 4 Drawing Sheets

POLYAMIDE-IONOMER GRAFT COPOLYMER AND BLENDS THEREOF FOR USE IN GOLF BALL COVERS OR MANTLES

CROSS REFERENCE TO RELATED APPLICATIONS

This is a continuation-in-part application and claims priority from U.S. application Ser. No. 09/523,563, filed on Mar. 10, 2000 now U.S. Pat. No. 6,384,140, which is a continuation-in-part application of U.S. application Ser. No. 09/241,186, filed on Feb. 1, 1999 now U.S. Pat. No. 6,380,310, which is a divisional of U.S. application Ser. No. 08/763,070, filed on Dec. 10, 1996, now issued as U.S. Pat. No. 5,886,103.

FIELD OF THE INVENTION

The present invention relates to compositions suitable for golf ball constructions and to golf balls which employ such compositions. Specifically, these compositions comprise graft copolymers and preferably include polyamide-ionomer graft copolymers.

BACKGROUND OF THE INVENTION

Modern golf balls typically employ ionomeric resins as cover materials. Ionomeric resins, as a result of their toughness, durability, and wide range of hardness values, have become materials of choice for golf ball covers over traditional rubbers. Ionomeric resins generally comprise an alpha-olefin and an alpha, beta ethylenically unsaturated mono- or dicarboxylic acid neutralized with metal ions to the extent desired. Olefins which have been employed to prepare ionomeric resins include ethylene, propylene, butene-1 and the like. Unsaturated carboxylic acids which have been employed to prepare ionomeric resins include acrylic, methacrylic, ethacrylic, o-chloroacrylic, crotonic, maleic, fumaric, itaconic and the like. Ionomeric resins include copolymers of ethylene with acrylic acid such as those sold by Exxon Corporation under the trademark "IOTEK", as well as copolymers of ethylene with methacrylic acid such as those sold by E.I. DuPont Nemours & Company under the trademark "SURLYN". In some instances, a softening comonomer such as an acrylate ester has been included such that the ionomeric copolymer is an ionomeric terpolymer. Although various compositions have been employed to provide golf balls of varying playability characteristics, a need continues for compositions and covers which can be employed to provide golf balls which exhibit good playability and durability.

Generally, polyamides are polymers that contain recurring amide groups as integral parts of the main polymer chains. Amides are closely related to carboxylic acids. In a simple amide, the OH group of the carboxylic acid is replaced by an $NH_2$ group. Polyamides are frequently referred to by their generic term "nylons." Nylons are used in the production of synthetic fibers and engineering resins. A variety of polyamides exist including aromatic polyamides, polyamide fibers, and plastic polyamides.

There are no commercially available golf balls which are generally known to contain nylon. Nylon alone would be too brittle for use in a golf ball cover. When efforts have been made in other fields to blend nylon with softer materials some degree of incompatibility often has resulted, rendering the blends susceptible to cracking and premature failure. U.S. Pat. No. 4,690,981, the contents of which are incorporated herein by reference, shows soft terpolymer ionomers of ethylene/unsaturated carboxylic acid/softening comonomer which are useful in injection-molded items such as ski boots, ice skate shells, as coatings for fabrics, and as a replacement for balata in golf balls. The unsaturated carboxylic acid may be, for example, acrylic acid and methacrylic acid. The softening comonomer is, for example, an alkyl acrylate such as n-butyl acrylate. The '981 patent briefly mentions that the ionomers can be blended with other materials such as nylon, polypropylene, propylene-ethylene copolymers, linear polyethylene, and ethylene/unsaturated carboxylic acid copolymers. However, there is no indication that blends can be used for golf balls.

In view of known strength and durability properties of nylon, it would be desirable to somehow utilize nylon in the construction of a golf ball. Specifically, it would be desirable to identify particular types of nylon materials that might be uniquely adapted to serve as materials for golf ball construction. There is a particular need for improved golf ball cover materials.

SUMMARY OF THE INVENTION

The present invention achieves the above-noted objectives and provides, in a first aspect, a golf ball having a core and a cover disposed about the core in which at least one of the core and the cover includes a composition comprising a polyamide-ionomer graft copolymer.

In another aspect, the present invention provides a golf ball comprising a core, at least one mantle layer disposed about the core and a cover disposed about the mantle layer. At least one of the core, the mantle layer, and the cover includes a polyamide-ionomer graft copolymer. The mantle layer may include one or more layers. Moreover, the golf ball may comprise one or more other intermediate layers disposed between the core and the cover.

In another aspect, the present invention provides a golf ball comprising a cover and a centrally disposed core. The core and/or the cover includes a composition blend comprising a polyamide-ionomer graft copolymer and an ionomer.

In yet another aspect, the present invention provides a golf ball comprising a core, a mantle layer disposed about the core, and a cover layer disposed about the mantle layer. Any of the core, the mantle layer, or the cover comprises a blend composition. The blend composition comprises a polyamide-ionomer graft copolymer and an ionomer.

In a further aspect, the present invention provides a method of making a golf ball comprising the steps of obtaining a golf ball core and forming a cover layer about the core. The core and/or the cover layer includes a resin composition comprising a graft copolymer of a polyamide component and an ionomeric component.

In still another aspect, the present invention provides a method for making a golf ball that includes the steps of obtaining a golf ball core, molding a mantle layer over the core to form an intermediate golf ball, and forming a cover layer over the intermediate golf ball. At least one of the core, the mantle layer, and the cover includes a graft copolymer comprising a polyamide component and an ionomeric component.

In anther aspect, the present invention provides a method of making a golf ball which includes the steps of obtaining a golf ball core and forming a cover layer over the core. At least one of the core and the cover comprises a composition blend. The composition blend comprises a polyamide-ionomer graft copolymer and an ionomer.

In yet another aspect, the present invention provides a method for making a golf ball that includes obtaining a golf ball core, forming a mantle layer about the core, and forming a cover layer about the mantle layer. Any of the core, the mantle layer, and the cover includes a composition comprising a blend of a polyamide-ionomer graft copolymer and an ionomer.

The invention comprises the several steps and the relation of one or more such steps with respect to each of the others, and the article possessing the features, properties and the relation of elements exemplified in the following detailed disclosure.

Figure 1:
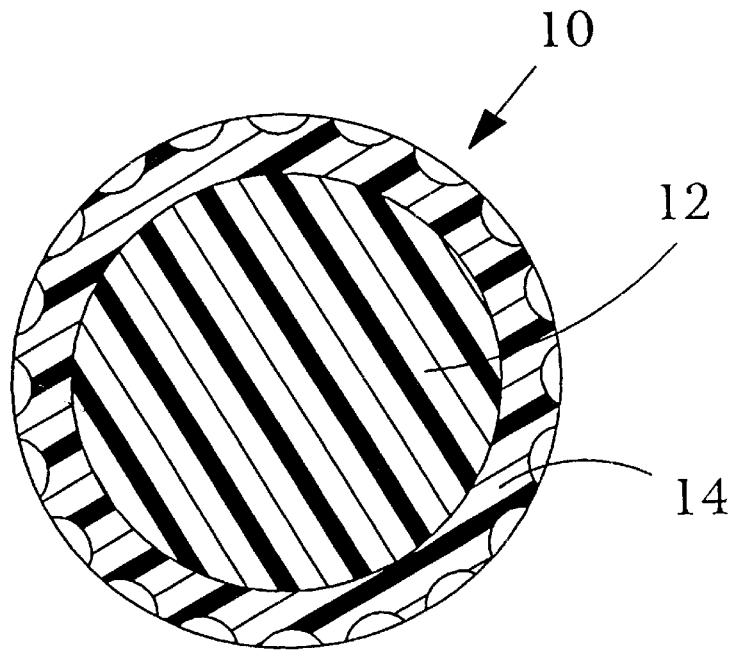
FIG. 1 shows a cross-sectional view of a golf ball with a cover comprising a polyamide-ionomer graft copolymer material or resin.

The above referenced figures are not to scale, but are merely illustrative of the present invention. Specifically, the figures are for purposes of illustrating the present invention and not to be construed as limiting the invention described herein.

DETAILED DESCRIPTION OF THE PREFERRED EMBODIMENTS

The present invention relates to golf balls which employ compositions comprising polyamides, preferably as inner and/or outer cover compositions of golf balls having a core and one, two, or more cover layers formed thereon. The polyamide containing compositions preferably include graft copolymers, more preferably polyamide containing compositions that include polyamide-ionomer graft copolymers and/or polyamide-ionomer graft copolymers blended with ionomeric copolymers.

Specifically, in accordance with the present invention, a hard, heat-resistant impact modified polyamide-ionomer graft copolymer is used in a golf ball cover or mantle. The polyamide material is preferably an isophthalic acid polyamide or caprolactam (nylon 6). The polyamide is preferably grafted with an ethylene-acrylic acid or ethylene-methacrylic acid copolymer that is either used in such a form or ionomerized.

Polyamides

The nomenclature for polyamides is as follows. When polyamides are identified by a single number, that polyamide product is formed from a single reactant and the number represents the number of carbon atoms in the linear chain of the recurring polymer unit. When two reactants are used in the manufacture, they are represented by two numbers separated by a comma. The first number refers to the number of carbon atoms in the diamine and the second number to the number of carbon atoms in the dibasic acid. Thus, for example, the polyamide from caprolactam is known as nylon 6 and that from hexamethylenediamine and adipic acid as nylon 6,6. Polyamide copolymers are denoted by a slash "/". For example, nylon 6/6,6 is a copolymer of a polyamide from caprolactam (nylon 6) and a polyamide from hexamethylenediamine and adipic acid (nylon 6,6).

Isophthalic acid and related isomers, phthalic acid and terephthalic acid, are aromatic carboxylic acids. Isophthalic acid reacts with other chemicals to form polyamides, esters, salts, acid chlorides and other derivatives. Worldwide, the primary producers of isophthalic acid are the BP Amoco Corporation in the United States and Belgium, Societ Italiana Serie Acetica Sintetica SpA (SISAS) in Italy, and A.G. International Chemical Co., Inc., in Japan.

Selected physical and chemical properties of isophthalic acid are shown in Tables 1 and 2.

TABLE I

Physical Constants and Properties of Isophthalic Acid

| Property | Value |
| --- | --- |
| Melting Point (closed tube), ° C. | 345–348 |
| Vapor Pressure, kPa[a] | |
| at 100° C. | 0.009 |
| 125° C. | 0.08 |
| 230° C. | 0.23 |
| 260° C. | 1.03 |
| 290° C. | 3.98 |
| Specific Gravity at 4° C. | 1.53 |
| Heat of Combustion at 25° C., kJ/mol[b] | −3202 |
| Heat of Formation at 25° C., kJ/mol[b] | −802 |
| Heat of Sublimation at 25° C., kJ/mol[b] | 106.7 |

[a]To convert kPa to mm Hg, multiply by 7.5.
[b]To convert J to cal, divide by 4.184.

TABLE 2

Solubilities of Isophthalic Acid[a]

| | Temperature, ° C. | | | | |
| --- | --- | --- | --- | --- | --- |
| Solvent | 25 | 50 | 100 | 150 | 200 |
| water | 0.012 | 0.035 | 0.32 | 2.8 | 25 |
| acetic acid (glacial) | 0.23 | 0.41 | 1.3 | 4.3 | 11.1 |
| methanol | 2.5 | 4.0 | | | |
| 1-propanol | 1.7 | 2.7 | 7.0 | | |
| dimethylformamide | 37 | | | | |
| dimethyl sulfoxide | 64 | | | | |

[a]g/100 g solvent

An "isophthalic acid polyamide" as used herein is a polyamide that is formed from reacting one or more of phthalic acid, isophthalic acid, and terephthalic acid.

A particular form of isophthalic acid polyamide resins known as polyphthalamides have excellent mechanical properties such as strength, stiffness and fatigue resistance over a broad temperature range. For instance, a 45 percent glass-reinforced grade exhibits a flexural strength of 45,000 psi (310 MPa) and a modulus of over 2 million psi (13.8 GPa) and is virtually unaffected by typical moisture or humidity levels. Other properties are set forth below in Table 3.

TABLE 3

Properties of Polyphthalamide, Dry as Molded

| Property | Polyphthalamide (PPA) |
| --- | --- |
| water absorption, % | |
| 24 h | 0.81 |
| 50% rh | |
| saturation | |
| melting point, ° C. | 310 |
| glass-transition temperature, $T_g$, ° C. | 123–135 |
| tensile strength, MPa[a] | 104 |
| flexural modulus, MPa[a] | 3300 |
| elongation at break, % | 6.4 |
| notched Izod impact strength, J/m[b] | 53 |
| DTUL[c] at 1.8 MPa[a], ° C. | 120 |
| starting materials | hexamethylene-diamine |
| amine | |
| acid | adipic acid, iso/terephthalic acids |

[a]To convert MPa to psi, multiply by 145.
[b]To convert J/m to ft-lb/in., divide by 53.38.
[c]Deflection temperature under load.

Polyphthalamide resins are readily fabricated with competitive cycle times into many intricate parts using conventional molding equipment. Molded parts exhibit very low warpage and shrinkage, and the resin does not corrode tooling or require critical drying procedures, as do polyesters and polycarbonates.

A particularly preferred form of polyphthalamide resin is AMODEL®, which is produced by the BP Amoco Corporation. AMODEL® is formed from isophthalic, phthalic or terephthalic acid, or a combination thereof. AMODEL® is a semi-crystalline engineering polymer which, according to BP, bridges the cost-performance gap between traditional engineering thermoplastics such as polycarbonate, nylons, polyesters and acetals and higher cost specialty polymers such as liquid crystal polymers, polyphenylene sulfide and polyether imide. Properties of a most preferred AMODEL® resin are set forth in Table 4, presented later herein.

A range of AMODEL® resin grades are available. Unreinforced grades are formulated for injection molding and extrusion applications which require high surface gloss, lubricity, low warpage and toughness, along with a high level of mechanical performance at elevated temperatures.

Glass-filled grades provide higher stiffness, strength and elevated temperature creep-resistance for structural type applications. Mineral-filled resins offer enhanced dimensional stability and flatness. Some of the AMODEL® grades can be plated, epoxy coated and oven cured.

Combination mineral glass products may be added to the polyphthalamide polymer to provide a balance between dimensional-type properties and increased stiffness and strength that glass-reinforced grades provide.

Impact-modified grades may be added to the polyphthalamide polymer to provide significantly improved toughness comparable to the super-tough nylons, but with much higher strength and stiffness across a broad humidity and temperature range.

In the present development, the isophthalic acid polyamide composition formed is utilized as a component of a polyamide-ionomer graft copolymer for a golf ball cover or mantle. Alternatively, polyamide-ionomer graft copolymers according to the present invention may be blended with other comparable components, such as acrylic and methacrylic ionomers.

The high degree of hardness of the polyamide resin decreases the spin rates of a golf ball when hit by a golf club, and increases the distance which a ball travels. Also, the high degree of hardness provides excellent durability, such as measured by the barrel test.

Ionomers/Ionomeric Copolymers

An "ionomer" or, in the alternative, an "ionomeric copolymer" as used herein, is a copolymer of an alpha-olefin and an alpha, beta-ethylenically unsaturated mono- or dicarboxylic acid with at least 3% of the carboxylic acid groups being neutralized with metal ions. The alpha-olefin preferably has 2 to 8 carbon atoms. An example of a preferred alpha-olefin is ethylene. The carboxylic acid preferably is acrylic acid, methacrylic acid, ethacrylic acid, maleic acid, o-chloroacrylic acid, crotonic acid, fumaric acid, itaconic acid or the like. Additionally, ionomeric copolymers may contain carboxylic acid derivatives, including, but not limited to anhydrides. An exemplary anhydride is maleic anhydride The metal ions include at least one cation selected from the group consisting of zinc (Zn), magnesium (Mg), lithium (Li), barium (Ba), potassium (K), calcium (Ca), manganese (Mn), nickel (Ni), chromium (Cr), tin (Sn), aluminum (Al), sodium (Na), copper (Cu), or the like. Preferably the cation is zinc, sodium or lithium or a combination thereof. The term "copolymer" includes (1) copolymers having two types of monomers which are polymerized together, (2) terpolymers (which are formed by the polymerization of three types of monomers), and (3) copolymers which are formed by the polymerization of more than three types of monomers.

Polyamide-Ionomer Graft Copolymers and Blends Thereof

A "polyamide component" as used herein is a polyamide homopolymer, a polyamide copolymer containing two or more types of amide units, e.g. nylon 6, 12, or a combination of both a polyamide homopolymer and a polyamide copolymer. The polyamide component preferably is a long chain polymer, not an oligomer, which typically is a short chain polymer of 2 to 10 units.

An "ionomeric component" as used herein is (a) a non-polyamide-containing ionomer or ionomeric copolymer which is capable of being mixed or blended with the polyamide component, (b) the ionomeric portion of a polyamide-containing ionomer or ionomeric copolymer, or a combination of both (a) and (b). If the polyamide component and ionomeric component are bonded to one another, the acid portion of the ionomeric component preferably is neutralized before the reaction of the polyamide and ionomeric components, but most probably could also be neutralized after the reaction of the polyamide and ionomeric components.

Graft copolymers comprise one type of polymer chemically bonded, i.e., grafted, to a main polymer chain of a different type of polymer. The main polymer chain of a graft copolymer is referred to herein as the backbone of the graft copolymer. Graft copolymers are formed by chemically bonding, i.e., grafting, one or more side chain polymers to the backbone. Side chain polymers are referred to herein as grafts. Grafting occurs through the linkage of a reactive site on a graft to a reactive site on the backbone. Specifically, the graft is chemically bonded to the backbone via reactive sites on the backbone polymer.

Polyamide-ionomer compositions according to the present invention preferably include graft copolymers, and most preferably include polyamide-ionomer graft copolymers. Polyamide-ionomer graft copolymers include a polyamide component and an ionomeric component. The present invention contemplates both polyamide-ionomer graft copolymers having a polyamide backbone with ionomeric copolymer grafts, and polyamide-ionomer graft copolymers having an ionomeric copolymer backbone with polyamide grafts. In one form of the invention, polyamide-ionomer graft copolymers are further mixed with one or more additional polymers to form a blend. Preferably, in a blended composition, polyamide-ionomer graft copolymers are blended with ionomeric copolymers.

In one preferred embodiment, a polyamide-ionomer graft copolymer includes a backbone comprising a polyamide component having one or more ionomeric components grafted thereto. In another preferred embodiment, a polyamide-ionomer graft copolymer according to the present invention comprises a backbone having an ionomeric component to which one or more polyamide components are grafted. Grafting preferably occurs through amide or imide linkages, via reactions of an amine or amide group of the polyamide component with the reactive sites, i.e., carboxylic acid groups or anhydride groups, of the ionomeric component.

The present invention contemplates that the polyamide component in a polyamide-ionomer graft copolymer according to the present invention may be any suitable polyamide polymer. Preferably, the polyamide component is employed in the backbone of a graft copolymer. Non-limiting examples of polyamide polymers suitable as the polyamide component include polyphthalamide, polyisophthalamide, polyterephthalamide, polycaprolactam (nylon 6), polyhexamethyleneadipimide (nylon 6,6), polyhexamethyleneisophthalamide, polyhexamethylene-dodecanediamide (nylon 6,12), nylon 11, nylon 12, nylon 46, nylon 6,10, nylon 6/6,6, nylon 6/12, nylon 6,6/12, and nylon 6/6,10. Preferred polyamides include polyphthalamide, and caprolactam. As previously described herein, the polyamide component may include a polyamide homopolymer, a polyamide copolymer, or combinations thereof.

A particularly preferred polyamide that can be used in the present invention is polyphthalamide. Polyphthalamides are a semi-crystalline, aromatic polyamide. Polyphthalamides may be formed from phthalic acid, isophthalic acid and terephthalic acid or a blend thereof. Phthalic acid, isophthalic acid and terephthalic acid are dicarboxylic acids attached to benzyl rings. Polyphthalamides are formed by including phthalic acid, isophthalic acid or terephthalic acid into a long polyamide chain thereby creating a particular form of aromatic polyamide.

Any suitable ionomeric copolymer may be used as the ionomeric component in a graft copolymer according to the present invention. The ionomeric component is used as any of the backbone or the polymer grafts. Preferably the ionomeric component is utilized as a polymer graft, being grafted to a polyamide backbone.

Ionomeric copolymers as previously described herein are copolymers of an alpha-olefin and an alpha, beta-ethylenically unsaturated carboxylic acid, wherein a portion of the carboxylic acid groups are partially neutralized. Non-limiting examples of suitable ionomeric copolymers include ionomers, preferably zinc neutralized ionomers, of ethylene acrylic acid, ethylene methacrylic acid, ethylene ethacrylic acid, ethylene itaconic acid, ethylene fumaric acid, ethylene maleic anhydride, ethylene maleic acid, ethylene crotonic acid, ethylene o-chloroacrylic acid, and combinations thereof. Polyamide-ionomer graft copolymers, and also blended compositions, preferably comprise ionomeric copolymers of ethylene acrylic acid, and ethylene methacrylic acid.

As previously described herein, ionomeric copolymers also include terpolymers. Ionomeric copolymers that are terpolymers preferably comprise an olefin, an alkyl acrylate, and a carboxylic acid. Terpolymers are discussed in greater detail with respect to the preferred embodiments. Non-limiting examples of suitable terpolymers include ionomers of ethylene/acrylate/acrylic acid, ethylene/methyl acrylate/acrylic acid, ethylene/n-butyl acrylate/acrylic acid, and ethylene/n-butyl acrylate/methacrylic acid.

Ionomeric copolymers have a carboxylic acid content that is preferably from about 3% to about 25% by weight of the ionomeric copolymer. The ionomeric copolymer may be any of a high-acid ionomer, a low-acid ionomer, or blends thereof. High-acid ionomers have a carboxylic acid content preferably from about 17% to about 25% by weight of the ionomer, and more preferably from about 18.5% to about 21.5% by weight of the ionomer. Low-acid ionomers have less than 16% by weight of carboxylic acid. Ionomeric copolymers utilized in accordance with the present invention are preferably high-acid ionomers.

Ionomeric copolymers as previously described herein are not limited to zinc neutralized ionomers. The present invention contemplates that various cation salts such as salts of sodium, potassium, magnesium, manganese, calcium, and nickel may be employed in a manner similar to zinc salts to provide various other ionomers and ionomeric copolymers.

Additionally, the present invention contemplates that a wide variety of degrees of neutralization may be employed to provide useful ionomers. Preferably, from about 3% to about 90%, more preferably from about 10% to about 80% and most preferably from about 30% to about 65% of the carboxylic acid groups of the ionomer copolymer are neutralized.

Polyamide-ionomer graft copolymers preferably comprise from about 30% to about 95% by weight, more preferably from about 50% to about 90% by weight, and most preferably from about 60% to about 72% by weight of a polyamide component, and preferably from about 70% to about 5% by weight, more preferably from about 50% to about 10% by weight, and most preferably from about 40% to about 28% by weight of an ionomeric component.

The present invention, as previously described herein, also contemplates compositions and/or materials that are blends of two or more polymers. Blended compositions according to the present invention include a polyamide-ionomer graft copolymer blended with a one or more additional polymer components. The polyamide-ionomer graft copolymers preferably comprise from about 20 wt. % to about 90 wt. %, more preferably from about 40 wt. % to about 80 wt. %, and most preferably from about 50 wt. % to about 75 wt. % of the blended composition; the one or more polymer components blended with the polyamide-ionomer graft copolymer preferably comprise from about 80 wt. % to about 10 wt. %, more preferably from about 60 wt. % to about 20 wt. %, and most preferably from about 50 wt. % to about 25 wt. % of the blended composition. The one or more additional polymer components preferably include any suitable ionomeric copolymer, i.e., an ionomer, as previously described herein.

Polyamide-ionomer graft copolymers and blends thereof preferably exhibit a flexural modulus of from about 1 kpsi to about 400 kpsi, more preferably from about 40 kpsi to about 200 kpsi, and most preferably from about 50 kpsi to about 100 kpsi.

Polyamide-ionomer graft copolymers according to the present invention are prepared by any suitable method known in the art. A preferred method includes mixing and reacting the backbone polymer with the graft polymer and heating in the molten state, typically at about 175° C. to about 250° C. Mixing is accomplished by any suitable method or apparatus known in the art such as a roll mill, a Brabender® mill, a Banbury® mill, a Haake® mixer, a melt extruder, a kneader, and/or internal mixers.

A preferred method for preparing a polyamide-ionomer graft copolymer is by an extrusion process utilizing a melt extruder. The extruder may be any of a single or twin screw extruder, more preferably a twin screw extruder. The polyamide component and the ionomer component are mixed and fed into a twin screw extruder and melt blended at a temperature of from about 200° C. to about 250° C.

An alternative method to preparing polyamide-ionomer graft copolymers includes heating and reacting the polyamide and ionomer components in solution at a temperature above the melting point of both the backbone and the graft copolymer.

Polyamide-ionomer graft copolymers are evidenced by various properties. Graft copolymers exhibit good melt clarity compared to polymer blends, which are cloudy in the melt. Additionally, polyamide-ionomer graft copolymers are typically a soluble, homogenous mix, as compared to polymer blends wherein the polymer components are typically immiscible and the mixes are separable from one another. Furthermore, at elevated temperatures, graft copolymers exhibit retention of physical properties such as tensile strength and flexural modulus.

A method for preparing polymer blends comprising polyamide-ionomer graft copolymers includes preparing a polyamide-ionomer graft copolymer as previously described herein and blending the polyamide-ionomer graft copolymer with a suitable polymer component. As previously described herein, blend compositions preferably include a polyamide-ionomer graft copolymer blended with an ionomeric copolymer. Blending is accomplished by any suitable method and/or apparatus known in the art, such as by blending in a roll mill, a Brabender® mill, a Banbury® mill, a Haake® mixer, a melt extruder, a kneader, and/or internal mixers at a temperature of from about 150° C. to about 250° C. A preferred method for preparing a blend is by feeding a polyamide-ionomer graft copolymer and an ionomeric copolymer into a twin screw extruder for melt blending at a temperature of from about 200° C. to about 250° C.

The details of interaction between a polyamide and an ionomeric copolymer are not fully understood. A polyamide and an ionomer could, for example, be intimately mixed without any bonding but with specific intermolecular interactions. Furthermore, it is possible, in a blend combining a specific quantity of a polyamide-ionomer graft copolymer with a specific quantity of ionomeric copolymer, that portions of the overall quantities of the graft copolymer component and ionomeric component could be bonded to each other, as in a graft reaction, while other portions of the graft copolymer component and ionomeric component could form a blend which may have specific intermolecular interactions. Thus, this application is not intended to be limited by the degree of bonding versus intermolecular interaction of the polyamide component and ionomeric component unless specifically indicated.

Golf Balls

The low spin golf balls of the invention preferably have a coefficient of restitution (C.O.R.) of at least 0.780 and more preferably at least 0.800. The Shore D hardness of a hard nylon-containing cover layer generally is at least 65 (measured generally in accordance with ASTM D-2240, but measured on the curved surface of the ball). Golf balls according to the present invention preferably exhibit a Riehle compression of about 75 or less, and most preferably about 71 or less. The PGA compression of the hard cover layer generally is from about 85 to about 117, more preferably from about 90 to about 105, and most preferably from about 90 to about 97. The high spin, softer golf balls of the invention preferably have a C.O.R. of at least 0.775 and more preferably at least 0.790, a Shore D hardness of from about 30 to about 60, and a PGA compression of from about 70 to about 100, more preferably from about 75 to about 95 and most preferably from about 75 to about 85. Both hard and soft nylon-containing covers preferably have a melt index of from about 0.5 to about 20 g/10 min., more preferably from about 0.5 to about 8 g/10 min., and most preferably from about 1 to about 4 g/10 mins.

In a first preferred embodiment, golf balls according to the present invention employ, preferably as a cover, a polyamide-ionomer graft copolymer composition. The polyamide-ionomer graft preferably comprises a polyamide backbone with one or more ionomeric copolymers grafted thereto. The polyamide backbone is preferably formed from of at least one of polycaprolactam (nylon 6) and polyhexamethyleneadipimide (nylon 6,6). The grafts are preferably at least one of a zinc neutralized ionomeric copolymer of ethylene acrylic acid and/or ethylene methacrylic acid. The polyamide is preferably about 50 wt. % to about 90 wt. % of the polyamide-ionomer graft copolymer, and the ionomeric copolymer is preferably about 10 wt. % to about 50 wt. % of the graft copolymer. More preferably, the polyamide is about 60 wt. % to about 72 wt. % of the graft copolymer, and the ionomeric copolymer is about 40 wt. % to about 28 wt. % of the graft copolymer.

Commercially available sources of polycaprolactam, i.e., nylon 6, include those sold under the tradenames DURETHAN, available from Bayer Corporation, and PALSKON and CAPRON, available from Allied Signal. The preferred ionomeric copolymers are zinc neutralized copolymers of ethylene methacrylic acid available from DuPont under the tradename SURLYN, and ethylene acrylic acid copolymers available from the Exxon Chemical Co. under the tradenames ESCOR and IOTEK. Copolymers, as previously described herein, refer to copolymers, terpolymers, and/or polymers formed by the polymerization of two or more 20 types of monomers.

In a second preferred embodiment, golf balls according to the invention employ, preferably as a cover, a polyamide-ionomer graft copolymer composition comprising a polyphthalamide backbone with one or more ionomeric copolymers grafted thereto.

Polyphthalamide resins are preferred for use in golf ball components because of their outstanding physical properties. Polyphthalamide resins are particularly preferred for use in golf ball covers. Compared to nylon 6/6, polyphthalamides are stronger, stiffer, less sensitive to moisture and have higher thermal capabilities. Polyphthalamides have desirable mechanical properties and creep resistance.

Polyphthalamides are characterized by having a high melting point (300 to 320° C.), good dimensional stability, good chemical resistance, and low water absorption.

A most preferred commercially available polyphthalamide is available from the BP Amoco Company under the tradename AMODEL®. AMODEL® polyphthalamide resins offer high fatigue strength, stiffness, and creep resistance over a broad temperature and humidity range. Particularly preferred forms of AMODEL® include AMODEL® AT-1001 and AMODEL® ET-1001 HS. AMODEL® ET-1001 HS has the properties set forth in Table 4. Commercially available sources of ionomeric copolymers include zinc neutralized copolymers of ethylene methacrylic acid available from DuPont under the tradename SURLYN, and ethylene acrylic acid copolymers available from Exxon under the tradenames ESCOR and IOTEK.

TABLE 4

Properties of a Preferred Polyphthalamide Amodel ® ET-1001 HS

| Property | Test Method ASTM | Typical Values | | | |
|---|---|---|---|---|---|
| | | U.S. Customary Units | | SI Units | |
| | | DAM[1] | Units | DAM[1] | Units |
| Tensile Strength | D 638 | 11,000 | psi | 76 | MPa |
| Tensile Elongation | D 638 | | | | |
| at Yield | | 6 | % | 6 | % |
| at Break | | 30 | % | 30 | % |
| Tensile Modulus | D 638 | 350 | kpsi | 2.4 | GPa |
| Flexural Strength | D 790 | 18,500 | psi | 128 | MPa |
| Flexural Modulus | D 790 | 380 | kpsi | 2.6 | GPa |
| Izod Impact, Notched | D 256 | 18 | ft-lb/in | 960 | J/m |
| Penetration Impact at 73° F. (23° C.) | D 3763 | | | | |
| Maximum Load | | 1,260 | lbs | 5,600 | N |
| Energy to Max. Load | | 32 | ft-lbs | 43 | J |
| Total Energy Absorbed | | 47 | ft-lbs | 64 | J |
| Penetration Impact at -10° F. (-23° C.) | D 3763 | | | | |
| Maximum Load | | 1,460 | lbs | 6,500 | N |
| Energy to Max. Load | | 34 | ft-lbs | 46 | J |
| Total Energy Absorbed | | 49 | ft-lbs | 66 | J |
| Poisson = s Ratio | | 0.35 | | 0.35 | |
| Deflection Temperature at 264 psi (1.8 MPa) | D 648 | 248 | ° F. | 120 | ° C. |
| Melting Point | D 3418 | 590 | ° F. | 310 | ° C. |
| Specific Gravity | D 792 | 1.15 | | 1.15 | |
| Moisture Absorption, 24 hours | D 570 | 0.65 | % | 0.65 | % |
| Mold Shrinkage[2] | | | | | |
| Flow Direction | | 1.5–2.0 | % | 1.5–2.0 | % |
| Transverse Direction | | 1.5–2.0 | % | 1.5–2.0 | % |

[1]DAM = dry, as molded
[2]Measured using a 4 × 4 × ⅛th inch (102 × 102 × 3 mm) plaque In still another embodiment, golf balls of the invention employ, preferably as a cover, a composition that includes a polyamide-ionomer graft copolymer blended with at least one other polymer. Preferably, the polyamide-ionomer graft copolymer is blended with an ionomeric copolymer, a terpolymer or the like.

Examples of suitable polyamide-ionomer graft copolymers include the graft copolymers described in accordance with the first and second embodiment golf balls described previously herein. Examples of suitable ionomeric copolymers for blending with the graft copolymer include those available from DuPont under the tradename SURLYN, and any of a copolymer or terpolymer available from Exxon under the tradenames ESCOR and IOTEK A most preferred ionomeric polymer is ESCOR ATX 320, an ethylene methyl acrylate acrylic acid terpolymer available from Exxon.

In yet another embodiment, golf balls of the invention employ, preferably as a cover, a composition that is the reaction product ("RP") of a reactive mixture of polyamide, ionomeric copolymer, and an ester. The RP preferably is formed from a reactive mixture of at least one of isophthalic acid, phthalic acid, and terephthalic acid; zinc neutralized ethylene/methacrylic acid ionomer copolymer; and ethylene (meth)acrylate. As used herein, the term "(meth)acrylate" includes both acrylates and methacrylates. The polyamide preferably is from about 50 wt. % to about 90 wt. % of the reactive mixture, the ionic copolymer is from about 5 to about 50 wt. % of the reactive mixture, and the copolymer is from about 1 to about 20 wt. % of the reactive mixture. More preferably, the polyamide is from about 60 to about 72 wt. % of the reactive mixture, the ionic copolymer is from about 26 to about 34 wt. % of the reactive mixture, and the ester copolymer, preferably olefin ester copolymer, is from about 2 to about 6 wt. % of the reactive mixture.

Commercially available products which are the reaction products of reactive mixtures of polyamide, ionic copolymer, and olefin ester copolymer include CAPRON 8351, available from Allied Signal. This reactive mixture, and the processing thereof, is believed to be described in U.S. Pat. No. 4,404,325, the teachings of which are incorporated herein by reference in their entirety. As described therein, the preferred polyamide is polyepsiloncaprolactam or polyhexamethyleneadipamide, most preferably polyepsiloncaprolactam. The preferred olefin ester copolymer is ethylene/ethyl acrylate. The preferred ionic copolymer is a zinc neutralized copolymer of ethylene/methacrylic acid available from DuPont under the tradename SURLYN 9721 (1801). According to claim 7 of U.S. Pat. No. 4,404,325, the polyamide is present in the reactive mixture in an amount of from about 60 to about 72 wt. %, the ionomeric copolymer is present in an amount of from about 26 wt. % to about 34 wt. %, and the olefin ester copolymer is present in an amount of from about 2 to about 6 wt. %, based on the total weight of the reactive mixture. It is believed that CAPRON 8351 has a nylon backbone with ionomer grafted thereto. Allied Signal states that CAPRON 8351 is a graft copolymer which has the properties shown in Table 5 below.

TABLE 5

| Property | Test Method (ASTM) | Value |
|---|---|---|
| Specific Gravity | D-792 | 1.07 |
| Yield Tensile Strength, psi (MPa) | D-638 | 7800 (54) |
| Ultimate Elongation % | D-638 | 200 |
| Flexural Strength, psi (MPa) | D-790 | 9500 (65) |
| Flexural Modulus, psi (MPa) | D-790 | 230,000 (1585) |
| Notched Izod Impact ft-lbs/in | D-256 | No break |
| Drop weight Impact ft-lbs (J) | D-3029 | 150 (200) |
| Drop weight Impact @ -40 F, ft-lbs (J) | D-3029 | 150 (200) |
| Heat Deflection temp. @ 264 psi, ° C. | D-648 | 60 |
| Melting Point, ° C. | D-789 | 215 |

CAPRON 8351 is the most preferred RP for use in the invention. Variations of CAPRON 8351 also may be used. For example, variations of CAPRON 8351 which may be used include those which employ polyepsiloncaprolactam or polyhexamethyleneadipamide with olefin ester copolymers such as ethylene/methyl acrylate, ethylene/ethyl methacrylate, and ethylene/methyl methacrylate. Ionic copolymers which may be used in variations of CAPRON 8351 include ionic copolymers of an alpha olefin of the formula $RCH=CH_2$ where R is H or alkyl radicals having 1 to 8 carbons, and an alpha, beta ethylenically unsaturated carboxylic acid having from 3 to 8 carbons. The ionic copolymer has at least about 10 wt. % of the COOH groups neutralized with metal cations, preferably Zn. Examples of these ionic copolymers include Zn neutralized ethylene/methacrylic acid. In variations of CAPRON 8351, the reactive mixture neutralized to produce such variations may include from about 50 wt. % to about 90 wt. % polyamide, from about 5 wt. % to 50 wt. % ionic copolymer, and from about 1 wt. % to about 20 wt. % olefin ester copolymer, all percents based on the weight of the reactive mixture.

In another embodiment, golf balls of the invention employ, preferably as a cover, a composition that includes the RP and at least one terpolymer. Terpolymers which may be employed include olefin/alkyl (meth)acrylate/carboxylic acid terpolymers. These terpolymers typically have from about 50 wt. % to about 98 wt. % olefin, from about 1 wt. % to about 30 wt. % alkyl acrylate, and from about 1 wt. % to about 20 wt. % carboxylic acid. The olefin may be any of ethylene, propylene, butene-1, hexene-1 and the like, preferably ethylene. The alkyl (meth)acrylate may be any of methyl acrylate, methyl methacrylate, ethyl acrylate, ethyl methacrylate, butyl acrylate, butyl methacrylate, butyl vinyl ether, methyl vinyl ether, and the like, preferably methyl acrylate. The carboxylic acid may be any one of acrylic acid, methacrylic acid, maleic acid, and fumaric acid. Monoesters of diacids such as methyl hydrogen maleate, methyl hydrogen fumarate, ethyl hydrogen fumarate, and maleic anhydride, which is considered to be a carboxylic acid, may also be used. Preferably, the carboxylic acid is acrylic acid. Useful ethylene/methyl acrylate/acrylic acid terpolymers may comprise from about 98 wt. % to about 50 wt. %, preferably from about 65 wt. % to about 85 wt. %, most preferably about 76 wt. % ethylene, from about 1 wt. % to about 30 wt. % preferably from about 15 wt. % to about 20 wt. %, most preferably about 18 wt. % methyl acrylate, and from about 1 wt. % to about 20 wt. %, preferably from about 4 wt. % to about 10 wt. %, most preferably about 6 wt. % acrylic acid.

Olefin/alkyl (meth)acrylate/carboxylic acid terpolymers which are preferred for use in the compositions employed in the invention are ethylene/methyl acrylate/acrylic acid terpolymers such as those marketed by Exxon Chemical Co. under the name ESCOR®. Examples of these terpolymers include ESCOR ATX 320 and ESCOR ATX 325. The properties of ESCOR ATX 320 and ESCOR ATX 325 as provided by Exxon are presented in Table 6.

TABLE 6

| Property/Resin | ESCOR ATX-320 | ESCOR ATX-325 |
|---|---|---|
| Melt Index[1] | 5.0 g/10 min | 20.0 g/10 min |
| Density[1] | 0.950 g/cc | 0.950 g/cc |
| Melting Point[1] | 69° C. | 67° C. |
| Crystallization Temperature[1] | 51° C. | 50° C. |
| Vicat Softening Temperature 200 g[2] | 66° C. | 60° C. |
| Tensile Strength @ yield[3] | 12 MPa | 7.8 MPa |
| Hardness[4] | 34 | 30 |
| Elongation @ break[3] | >800% | >800% |

[1]Exxon Method
[2]ASTM D 1525
[3]ASTM 638
[4]Shore D

Other olefin/alkyl (meth)acrylate/carboxylic acid terpolymers which may be employed with the RP in the composi-tions employed in the invention include but are not limited to:

ethylene/n-butyl acrylate/acrylic acid,
ethylene/n-butyl acrylate/methacrylic acid,
ethylene/2-ethoxyethyl acrylate/acrylic acid,
ethylene/2-ethoxyethyl acrylate/methacrylic acid,
ethylene/n-pentyl acrylate/acrylic acid,
ethylene/n-pentyl acrylate/methacrylic acid,
ethylene/n-octyl acrylate/acrylic acid,
ethylene/2-ethyhexyl acrylate/acrylic acid,
ethylene/n-propyl acrylate/acrylic acid,
ethylene/n-propyl acrylate/methacrylic acid,
ethylene/n-heptyl acrylate/acrylic acid,
ethylene/2-methoxyethyl acrylate/acrylic acid,
ethylene/3-methoxypropyl acrylate/acrylic acid,
ethylene/3-ethoxypropyl acrylate/acrylic acid, and
ethylene/acrylate/acrylic acid.

Compositions which may be employed to provide golf balls according to this embodiment of the invention include from about 1 wt. % to about 90 wt. %, preferably from about 1 wt. % to about 30 wt. %, most preferably about 15 wt. % RP and from about 99 wt. % to about 10 wt. % terpolymer, preferably from about 99 wt. % to about 70 wt. %, most preferably about 85 wt. % terpolymer.

In another embodiment, golf balls of the invention employ, preferably as a cover, compositions which include the RP and an olefin/alkyl acrylate/carboxylic acid terpolymer ionomer. Typically, the carboxylic acid groups of the terpolymer ionomer are partially (i.e., approximately from about 5 to about 80 percent) neutralized by metal ions such as Li, Na, Zn, Mn, Ni, Ba, Sn, Ca, Mg, Cu and the like, preferably Zn, Na or Li or a combination thereof, most preferably Zn or Li or a combination thereof. These terpolymer ionomers usually have a relatively high molecular weight, e.g., a melt index of about 0.1 to 1000 g/10 min., and/or a weight average molecular weight of 5000 up to one million. The ethylene/methyl acrylate/acrylic acid terpolymer ionomer may comprise from about 50 wt. % to about 98 wt. %, preferably from about 50 wt. % to about 90 wt. %, most preferably about 76 wt. % ethylene, from about 1 wt. % to about 30 wt. %, preferably from about 15 wt. % to about 20 wt. %, most preferably about 18 wt. % methyl acrylate, and from about 1 wt. % to about 20 wt. %, preferably from about 4 wt. % to about 10 wt. %, most preferably about 6 wt. % acrylic acid. Useful terpolymer ionomers include, for example, ethylene/methyl acrylate/acrylic acid terpolymer ionomers sold by Exxon Chemical Co. under the designation "IOTEK" and ESCOR. Preferred terpolymer ionomers for use in the invention include Zn neutralized ethylene/methyl acrylate/acrylic acid terpolymer ionomers such as IOTEK 7520 and IOTEK 7510, and Li neutralized ionomers such as ESCOR ATX-320-Li-80.

ESCOR ATX-320-Li-80 is produced by utilizing a 6.0 wt. % acrylic acid/18.0 wt. % methyl acrylate/76 wt. % ethylene terpolymer produced by Exxon Chemical Co. under the designation ESCOR ATX 320. The acid groups present in the terpolymer then are neutralized to 80 mol % by Li using lithium hydroxymonohydrate. Neutralization is performed by adding lithium hydroxymonohydrate and ESCOR ATX 320 terpolymer to an intensive mixer (Banbury® type). The Li salt solubilizes in the ATX 320 terpolymer above the melting temperature of the terpolymer, and a vigorous reaction occurs with foaming as the Li cation reacts with the acid groups of the terpolymer, and volatile byproducts are evaporated. The reaction is continued until foaming ceases (i.e., about 30 to 45 minutes at 250° F. to 350° F.) and the batch is removed from the Banbury® mixer. Mixing continues on a hot two-roll mill (175° F. to 250° F.) to complete the neutralization reaction.

For the purpose of determining the weight percent of neutralization of the acrylic acid groups in the terpolymer ionomer after reacting with the Li salt, it is assumed that one mole of Li neutralizes one mole of acrylic acid. The calculations of neutralization are based upon an acrylic acid molecular weight of 72 g/mol, giving 0.067 moles of Li per 100 grams of the terpolymer.

Although ESCOR ATX 320 terpolymer can be 80 mol % neutralized by Li, it is to be understood that other degrees of neutralization with Li, ranging from about 3 mole % to about 90 mole %, may be employed to provide useful ionomers. Thus, for example, ATX 320 that is 20 mole % neutralized by Li, hereinafter referred to as ATX 320-Li-20 may be employed. In addition, various cation salts such as salts of Na, K, Mg, Mn, Ca and Ni may be employed in a manner similar to Li salts to provide various other ESCOR ATX 320 type terpolymer ionomers.

Other terpolymer ionomers which may be used in the compositions employed in this embodiment of the invention include ethylene/alkyl ester/methacrylic acid terpolymer ionomers such as those disclosed in U.S. Pat. No. 4,690,981, the teachings of which are incorporated by reference in its entirety herein, and which are available from DuPont Corp. under the tradename SURLYN. Properties of five SURLYN terpolymer ionomers which may be used in the invention are set forth in Table 7. The terpolymer ionomer may be from about 1 wt. % to about 99 wt. %, preferably from about 50 wt. % to about 99 wt. %, most preferably about 85 wt. %, all amounts based on the total weight of the RP-terpolymer ionomer composition. The RP may be from about 1 wt. % to about 99 wt. %, preferably from about 1 wt. % to about 50 wt. %, most preferably about 15 wt. %, all amounts based on the total weight of the composition.

TABLE 7

| Resin/Property | ASTM | Surlyn 7930 | Surlyn 7940 | Burtyn 8020[1] | Surlyn 8528 | Surlyn 8550 | Surlyn 8660 | Surlyn 8120[1] | Surlyn 8320[1] | Surlyn 9020[1] |
|---|---|---|---|---|---|---|---|---|---|---|
| Cation | | Li | Li | Na | Na | Na | Na | Na | Na | Zn |
| Melt Flow Index (g/10 min) | D-1238 | 1.8 | 2.6 | 1 | 1.3 | 3.9 | 10 | 0.9 | 0.9 | 1.1 |
| Density | D-792 | 0.94 | 0.94 | 0.95 | 0.94 | 0.94 | 0.94 | 0.94 | 0.94 | 0.96 |
| Notched Izod | D-256 | NB[1] | NB[1] | NB[1] | 11.4 | — | 16 | — | — | NB[2] |
| Tensile Impact (23C) ft-lb/in$^2$ | D-1822S | 140 | 220 | 630 | 550 | 795 | 345 | 235 | 213 | 610 |
| Flexural Mod (23C) kpsi | D-790 | 67 | 61 | 14 | 32 | 31.7 | 34 | 49.1 | 19.3 | 14 |
| Yield Strength (kpsi) | D-638 | 2.8 | 2.2 | — | 1.8 | 1.6 | 1.9 | 2.2 | 2.3 | — |
| Elongation (%) | D-638 | 290 | 285 | 530 | 450 | 419 | 470 | 680 | 770 | 510 |
| Hardness Shore D | D-2240 | 68 | 68 | 56 | 60 | 60 | 62 | 38 | 25 | 55 |
| Vicat Temp. (° C.) | D-1525-70 Rate B | 62 | 63 | 61 | 73 | 78 | 71 | 51 | 48 | 57 |

| Resin/Property | ASTM | Surlyn 9320[1] | Surlyn 9520 | Surlyn 9650 | Surlyn 9720 | Surlyn 9730 | Surlyn 9910 | Surlyn 9950 | Surlyn 9970 |
|---|---|---|---|---|---|---|---|---|---|
| Cation | | Zn | Zn | Zn | Zn | Zn | Zn | Zn | Zn |
| Melt Flow Index (g/10 min) | D-1238 | 0.6 | 1.1 | 5 | 1 | 1.6 | 0.7 | 5.5 | 1.4 |
| Density | D-792 | 0.94 | 0.95 | 0.96 | 0.96 | 0.95 | 0.97 | 0.96 | 0.95 |
| Notched Izod | D-256 | | 10.1 | 14.5 | NB[1] | NB[1] | 6.8 | NB[1] | NB[1] |
| Tensile Impact (23C) ft-lb/in$^2$ | D-1822S | | 570 | 460 | 600 | 590 | 485 | 485 | 360 |
| Flexural Mod | D-790 | 3.7 | 36 | 32 | 36 | 30 | 48 | 37 | 28 |
| Yield Strength (kpsi) | D-638 | 3.5 | 1.8 | 1.8 | 1.7 | 1.6 | 2 | 1.8 | 1.6 |
| Elongation (%) | D-638 | 500 | 410 | 410 | 440 | 460 | 290 | 490 | 460 |
| Hardness Shore D | D-2240 | 40 | 60 | 63 | 61 | 63 | 64 | 62 | 62 |
| Vicat Temp. (° C.) | D-70 Rate B | 454 | 74 | 71 | 71 | 73 | 62 | 66 | 61 |

[1]Terpolymer ionomers
[2]No Break

In another embodiment, golf balls of the invention employ, preferably as a cover, compositions of olefin/carboxylic acid copolymer ionomers made from two types of monomers and RP. Olefin/carboxylic acid copolymer ionomers which may be employed with RP include those wherein the carboxylic acid groups of the copolymer ionomer are partially (i.e., approximately 5 to 80 percent) neutralized by metal ions such as but not limited to Li, Na, Zn and Mg, preferably Zn, and Na. Ionic copolymers may be zinc neutralized ethylene/methacrylic acid ionomer copolymer, Na neutralized ethylene/acrylic acid copolymer ionomers, and mixtures thereof. The Zn neutralized ethylene/acrylic acid copolymer ionomer can be the reaction product of Zn neutralization of an ethylene/acrylic acid copolymer having from about 15 wt. % to about 20 wt. % acrylic acid and a melt index of about 37 to about 100. These copolymer ionomers usually have a relatively high molecular weight, e.g., a melt index of about 0.1 to 1000 g/10 min., and/or a weight average molecular weight of 5000 up to one million. Useful copolymer ionomers include, for example, ethylene/acrylic acid copolymer ionomers sold by Exxon Chemical Co. under the designation "IOTEK" such as IOTEK 7030, IOTEK 7020, IOTEK 7010, IOTEK 8030, IOTEK 8020, and IOTEK 8000. Non-limiting examples of preferred IOTEK copolymer ionomers for use in the invention include IOTEK 7010, IOTEK 7030 and IOTEK 8000. Properties of various IOTEK copolymer ionomers are shown in Tables 8–9.

Another embodiment of the invention is golf balls which employ, preferably as a cover, compositions of nylon homopolymer and/or copolymer and one or more olefin/alkyl acrylate/carboxylic acid terpolymer ionomers. Terpolymer ionomers which may be used with the nylon homopolymers preferably are ethylene/methyl acrylate/acrylic acid terpolymer ionomers. Nylon homopolymers for use in any of the compositions employed in the invention include but are not limited to nylon 6, nylon 6,6, and mixtures or copolymers thereof. Other nylons such as nylon 11, nylon 12, nylon 6,12, nylon 6,6/6 and nylon 46 also can be used as long as sufficient durability is achieved. In the case of nylon 6, a polyamide chain of about 140–222 repeating units is typically useful, but lower and higher molecular weight material may be employed. CAPRON 8202, a nylon 6 type polymer available from Allied Signal, is preferred. According to Allied Signal, CAPRON 8202 has the properties set forth in Table 10.

TABLE 8

| Resin/Property | ASTM Method | IOTEK 4000 | IOTEK 4010 | IOTEK 7010 | IOTEK 7020 | IOTEK 7030 | IOTEK 8000 | IOTEK 8020 | IOTEK 8030 | IOTEK* 7620 | IOTEK* 7510 | IOTEK 3110 |
|---|---|---|---|---|---|---|---|---|---|---|---|---|
| Cation | | Zn | Zn | Zn | Zn | Zn | Na | Na | Na | Zn | Zn | Na |
| Melt Flow Index g/10 min | D-1238 | 2.5 | 1.5 | 0.8 | 1.5 | 2.5 | 0.8 | 1.6 | 2.8 | 2 | 0.8 | 1.3 |
| Density kg/m$^3$ | D-792 | 964 | 966 | 968 | 966 | 964 | 957 | 0.956 | 956 | 962 | 970 | 939 |
| Melting Point, °C. | D-2240 | 85 | 84 | 83.5 | 84 | 85 | 83 | 84 | 87 | 67 | 67 | 95 |
| Crystallization Point. °C. | D-638 | 58 | 56 | 55 | 56 | 58 | 45 | 47 | 49 | 39 | 38 | 58 |
| Vicat Softening Point, °C. | D-638 | 60 | 60 | 60 | 60 | 60 | 54 | 54.5 | 55.5 | 40 | 40 | 75 |
| Flexural Modulus, MPa | D-790 | 155 | 175 | 190 | 175 | 155 | 320 | 340 | 355 | 30 | 35 | 260 |
| Tensile Impact at 23C, KJ/m$^2$ (Type S Dumbbell, 2 mm Thick Compression Plaques) | D-1822 | 480 | 520 | 550 | 520 | 480 | 570 | 550 | 500 | 780 | 950 | 580 |
| Plaque Properties (2 mm thick compression molding) | | | | | | | | | | | | |
| Tensile Strength at Break MPa | D-638 | 22.6 | 23.5 | 24.5 | 23.5 | 22.6 | 33 | 32.5 | 32 | 12 | 15 | 28 |
| Yield Point MPa | D-638 | 12 | 13 | 14 | 13 | 12 | 19 | 18.5 | 18 | 4 | 4 | 14 |
| Elongalion at Break % | D-638 | 460 | 450 | 440 | 450 | 460 | 370 | 380 | 410 | 680 | 570 | 510 |
| 1% Secant Modulus MPa | D-638 | 125 | 135 | 150 | 135 | 125 | 280 | 280 | 280 | 22 | 27 | 210 |
| Shore D Hardness | D-2240 | 52 | 53 | 54 | 53 | 52 | 60 | 60 | 60 | 30 | 35 | 55 |

*Terpolymer ionomer

TABLE 9

| Resin/Property | ASTM Method | EX 1001 | EX 1004 | EX 1006 | EX 1007 |
|---|---|---|---|---|---|
| Cation | EXXON | Na | Zn | Na | Zn |
| Melt Index (g/10 min) | D-1238 | 1.0 | 2.0 | 1.3 | 1.0 |
| Melting Point (°C.) | D-3417 | 83.7 | 82.5 | 86 | 85.8 |
| Crystallization Point (°C.) | D-3417 | 41.3 | 52.5 | 47.5 | 52.3 |
| Plaque Properties (2 mm thick compression molding) | | | | | |
| Tensile Strength at Break MPa | D-638 | 34.4 | 20.6 | 33.5 | 24.1 |
| Yield Point MPa | D-638 | 21.3 | 14.0 | 19.3 | 13.8 |
| Elongation at Break % | D-638 | 341 | 437 | 421 | 472 |
| 1% Secant Modulus MPa | D-638 | 356 | 128 | 314 | 154 |
| 1% Flexural Modulus MPa | D-790 | 365 | 130 | 290 | 152 |
| Shore D Hardness | D-2240 | 63 | 53 | 58 | 51 |
| Vincat Softening Point | D-1525 | 51.5 | 55 | 57 | 60.5 |

TABLE 10

| Property | Test Method (ASTM) | Value |
|---|---|---|
| Specific Gravity | D-792 | 1.13 |
| Yield Tensile Strength, psi (MPa) | D-638 | 11500 (80) |
| Ultimate Elongation % | D-638 | 70 |
| Flexural Strength, psi (MPa) | D-790 | 15700 (110) |
| Flexural Modulus, psi (MPa) | D-790 | 410,000 (2825) |
| Notched Izod Impact, ft-lbs/in | D-256 | 1.0 (55) |
| Heat Deflection Temp., @ 264 psi, °C. | D-648 | 65 |
| Melting Point, °C. | D-789 | 215 |
| Rockwell Hardness, R Scale | D-785 | 119 |

Terpolymer ionomers which may be employed include but are not limited to those having from about 50 wt. % to about 98 wt. %, preferably from about 60 wt. % to about 90 wt. %, most preferably about 76 wt. % ethylene, from about 1 wt. % to about 30 wt. %, preferably from about 15 wt. % to about 20 wt. %, most preferably about 18 wt. % methyl acrylate, from about 1 wt. % to about 20 wt. %, preferably from about 4 wt. % to about 10 wt. %, most preferably about 6 wt. % acrylic acid, wherein the acrylic acid has been neutralized by Zn, Li or Na or combinations thereof. Preferred terpolymer ionomers include IOTEK 7520, IOTEK 7510, ESCOR ATX 320-Li-80, or a mixture thereof. The nylon homopolymer may be present in the compositions an amount of from about 1 wt. % to about 99 wt. %, preferably from about 1 wt. % to 50 wt. %, most preferably about 15 wt. % of the composition. The terpolymer ionomer may be from about 99 wt. % to about 1 wt. %, preferably from about 99 wt. % to about 50 wt. %, most preferably about 85 wt. %, all amounts based on total weight of the composition.

ZYTEL 408 is a nylon 6,6 modified molding compound containing ionomer. It is believed that ZYTEL 408 is an intimate mixture of polyamide and an ionomeric terpolymer of an alpha-olefin, an acrylate ester, and an alpha, beta-ethylenically unsaturated mono- or dicarboxylic acid with a portion of the carboxylic acid groups being neutralized with metal ions. It is unknown whether ZYTEL 408 is a graft copolymer or a blend; however, ZYTEL 408 is believed to be a blend of nylon 6,6 and an ethylene alkylmethacrylate methacrylic acid terpolymer ionomer neutralized with Zn. The properties of ZYTEL 408, as provided by DuPont, are shown in Table 11.

TABLE 11

| Property | Test Method (ASTM) | Value[1] |
|---|---|---|
| Specific Gravity | D-792 | 1.09 |
| Tensile Strength (−40° F.) | D-638 | 15100 psi |
| Tensile Strength (−40° C.) | D-638 | 104.1 MPa |
| Flexural Modulus (−40° F.) | D-790 | 410,000 psi |
| Flexural Modulus (−40° C.) | D-790 | 2827 MPa |
| Izod Impact Strength at −40° F. | D-256 | 1.3 ft. lb./in. |
| Izod Impact Strength at −40° C. | D-256 | 69 J/m |
| Gardner Impact at −30° F. | D-3029 | >320 ft. lbs. |
| Heat Deflection temp. @ 1.8 × 10⁶ Pa | D-648 | 75° C. |
| Melting Point | D-789 | 255° C. |

[1]Dry as molded, with about 0.2% water

A further embodiment of the invention is golf balls which employ, preferably as a cover, compositions of polyamide homopolymers or copolymers, and olefin/carboxylic acid copolymer ionomers made from two types of monomers such as IOTEK. The polyamides which can be used in the compositions employed in the invention include but are not limited to nylon 6, nylon 6,6, nylon 11, nylon 12, nylon 6,12, nylon 6,6/6, nylon 46 and mixtures thereof, as long as sufficient durability is achieved. Preferably, the nylon polymer is any of nylon 6 and nylon 6,6, and most preferably nylon 6. In the case of nylon 6, a polyamide chain of about 140–222 repeating units is typically useful, but lower and higher molecular weight material may be employed. A preferred polyamide homopolymer is CAPRON 8202 available from Allied Signal. Useful copolymer ionomers include copolymer ionomers having from about 99 wt. % to about 70 wt. %, preferably from about 90 wt. % to about 80 wt. %, most preferably 85 wt. % ethylene, from about 1 wt. % to about 30 wt. %, preferably from about 10 wt. % to about 20 wt. %, most preferably 15 wt. % acrylic acid. A preferred ethylene/acrylic acid copolymer ionomer is IOTEK 7010 from Exxon Chemical Co. The copolymer ionomer may be present in the composition in an amount of from about 99 wt. % to about 1 wt. %, preferably from about 95 wt. % to about 70 wt. %, most preferably about 80 wt. % of the composition. The polyamide homopolymer may be from about 1 wt. % to about 99 wt. %, preferably from about 5 wt. % to about 30 wt. %, most preferably about 20 wt. %, wherein all amounts are based on the total weight of the composition.

Two or more copolymer ionomers may be preblended prior to blending with polyamide-ionomer graft copolymers to provide compositions which may be used in the invention. Thus, preblends of hard and soft copolymer ionomers, as well as preblends of high carboxylic acid copolymer ionomers and low carboxylic acid copolymer ionomers may be utilized to provide compositions for use in the invention. An example of such a preblend is a mixture of IOTEK 8000 and IOTEK 7010.

Another embodiment of the invention is golf balls which employ, preferably as a cover, compositions of polyamide homopolymers or copolymers, and olefin/alkyl acrylate/carboxylic acid terpolymers. Useful terpolymers include terpolymers having from about 50 wt. % to about 98 wt. %, preferably from about 60 wt. % to about 90 wt. %, most preferably about 76 wt. % olefin, preferably ethylene, from about 1 wt. % to about 30 wt. %, preferably from about 15 wt. % to about 20 wt. %, most preferably about 18 wt. % alkyl acrylate, preferably methyl acrylate, and from about 1 wt. % to about 20 wt. %, preferably from about 4 wt. % to about 10 wt. %, most preferably about 6 wt. % carboxylic acid, preferably acrylic acid. The terpolymer may be present in the composition an amount of from about 1 wt. % to about 99 wt. %, preferably from about 50 wt. % to about 99 wt. %, most preferably about 85 wt. % of the composition. The polyamide homopolymer may be present in the composition in an amount of from about 1 wt. % to about 99 wt. %, preferably from about 1 wt. % to about 50 wt. %, most preferably about 15 wt. %, wherein all amounts are based on the total weight of the composition. Useful polyamides may be of polyepsiloncaprolactam and polyhexamethyleneadipamide, more preferably nylon 6, nylon 6,6, nylon 11, nylon 12, nylon 6,12, nylon 6,6/6, nylon 46 and mixtures thereof. Preferably, the nylon polymer is any of nylon 6 and nylon 6,6, still more preferably nylon 6, most preferably the nylon homopolymer sold by Allied Signal under the tradename CAPRON 8202. A preferred ethylene/methyl acrylate/acrylic acid terpolymer is ESCOR ATX 320 from Exxon Chemical Co.

Two or more terpolymers may be preblended prior to blending with any of polyamide-ionomer graft copolymers, RP, or the polyamide homopolymers to provide compositions which may be used in the invention. Thus, preblends of hard and soft terpolymers, as well as preblends of high carboxylic acid terpolymers and low carboxylic acid terpolymers may be utilized to provide compositions for use in the invention.

Polyphthalamide materials or resins may be present in the golf ball component in an amount from about of 10 wt. % to about 60 wt. %, preferably from about 15 wt. % to about 50 wt. %, and most preferably from about 20 wt. % to about 40 wt. %, based upon the weight of the component, e.g., a cover for instance. More specifically, it is preferred that the present invention golf balls utilize cover compositions that comprise polyphthalamide or polyphthalamide materials in the noted proportions. Such cover compositions further comprise ionomeric materials grafted to a polyphthalamide backbone in amounts of from about 90 wt. % to about 40 wt. %, preferably of from about 85 wt. % to about 50 wt. %, and most preferably from about 80 wt. % to about 60 wt. %. The coefficient of restitution of a golf ball having polyphthalamide in the above ranges is at least 0.750, and preferably at least 0.800. The Riehle compression of a golf ball having polyphthalamide in the above amounts is no more than 75, and preferably less than 71.

Referring now to the drawings, and first to FIG. 1, a golf ball 10 including a core 12 and a cover 14 comprising a polyamide-ionomer graft copolymer material is shown.

Figure 2:
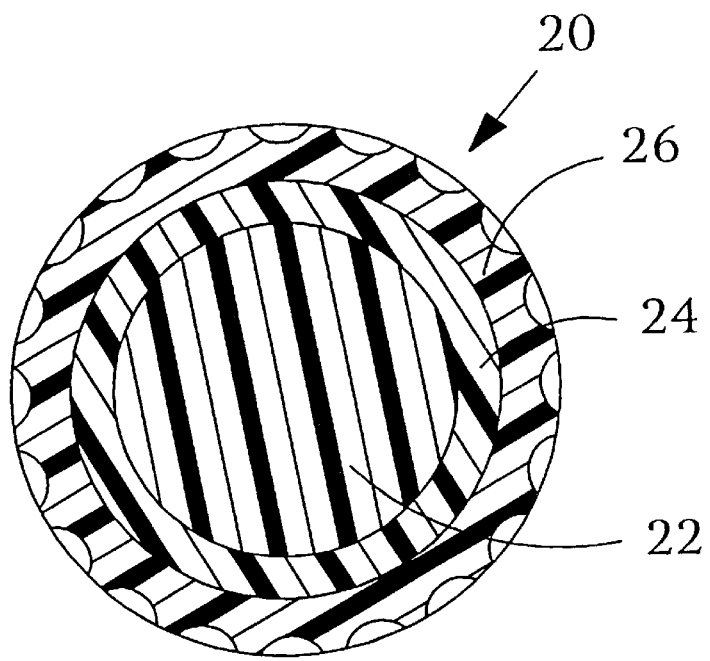
FIG. 2 shows a cross-sectional view of a multi-layered ball with a cover comprising a polyamide-ionomer graft copolymer.

FIG. 2 shows a multi-layered golf ball 20 having a core 22, an intermediate layer 24, and a cover 26 comprising a polyamide-ionomer graft copolymer.

Figure 3:
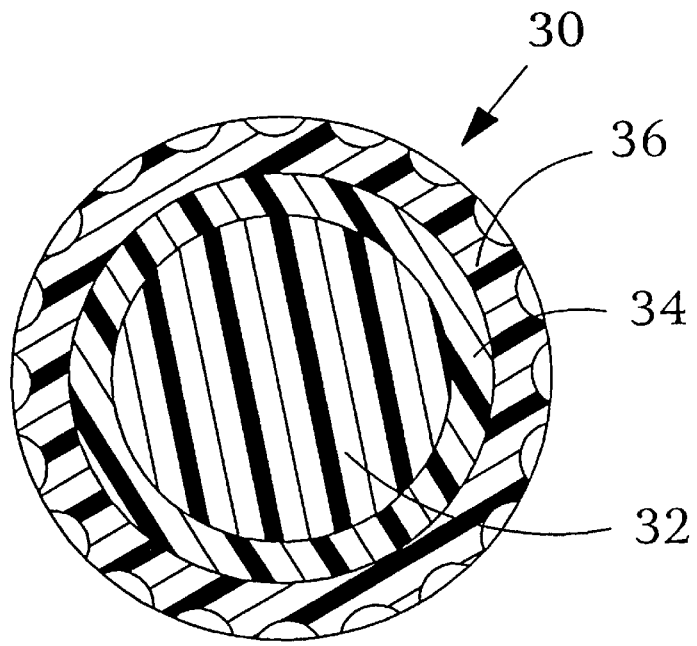
FIG. 3 is a cross-sectional view of a multi-layered golf ball with a mantle layer comprising a polyamide-ionomer graft copolymer.

FIG. 3 displays a multi-layered golf ball 30 having a core 32, a mantle layer 34, and a cover layer 36. Mantle layer 34 includes a material comprising a polyamide-ionomer graft copolymer.

Figure 4:
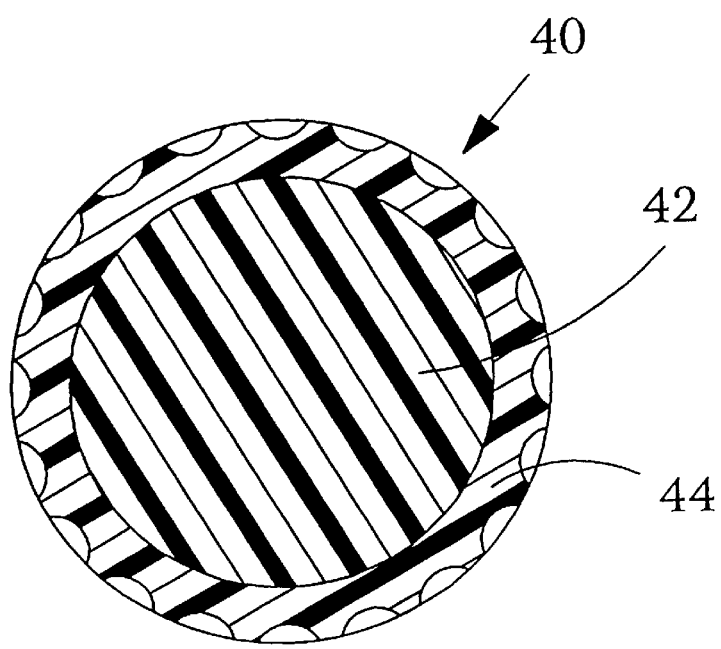
FIG. 4 is a cross-sectional view of a golf ball with a cover comprising a blend of polyamide-ionomer graft copolymer and an ionomer.

FIG. 4 shows a golf ball 40 having a core 42 and a cover 44 comprising a blend of a polyamide-ionomer graft copolymer and an ionomer.

Figure 5:
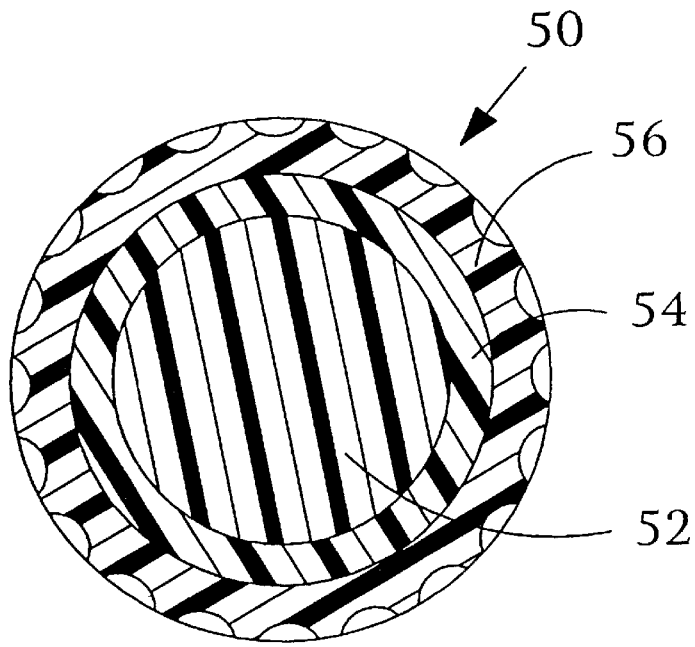
FIG. 5 is a cross-sectional view of a multi-layered golf ball with a cover comprising a blend of a polyamide-ionomer graft copolymer and an ionomer.

FIG. 5 illustrates a golf ball 50, which includes a core 52, a mantle layer 54, and a cover 56. The cover 56 includes a blend composition comprising a polyamide-ionomer graft copolymer and an ionomer.

Figure 6:
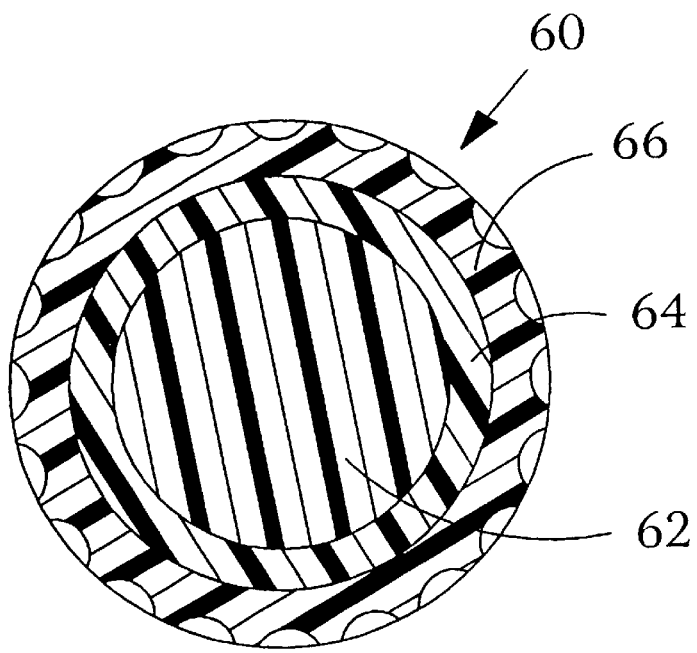
FIG. 6 shows a cross-sectional view of a multi-layered golf ball with a mantle layer comprising a blend of a polyamide-ionomer graft copolymer and an ionomer.

FIG. 6 is a golf ball 60 having a core 62, a mantle layer 64, comprising a blend of a polyamide-ionomer graft copolymer and an ionomer, and a cover 66.

The present invention contemplates that covers 14, 26, 36, 44, 56, and/or 66 may be any of a single layer cover or a multi-layer cover. Multi-layer covers include an outer cover layer disposed about one or more inner cover layers.

Although the compositions employed in the invention may be used in golf ball constructions including solid cores, one-piece balls, mantles, and covers, these compositions are preferably employed as mantles and/or covers. Mantle layers can be formed by injection molding or compression molding a suitable mantle material over a wound or solid molded core, or a liquid core to produce an intermediate golf ball. Suitable mantle materials include, but are not limited to, polyamide-ionomer graft copolymer compositions as described herein. Golf ball covers can be produced by injection molding or compression molding the nylon containing compositions employed herein over a wound or solid molded core, a liquid core, or a mantle layer of an intermediate golf ball, to produce a golf ball having a diameter of about 1.680 inches and weighing about 1.620 ounces. In golf balls comprising multi-layered covers, any of the cover layers may comprise the nylon-containing compositions employed herein.

Golf balls of the invention may be produced by forming covers which include compositions of the invention around cores by conventional molding processes. Additionally, golf balls are produced by forming a mantle layer around a core to form an intermediate golf ball, and subsequently forming a cover layer over the mantle layer. The mantle and/or cover material is mixed in a rigorous mixing procedure, preferably using a twin screw extruder or the like and an extrusion temperature of 200 to 250° C. In a two-layer golf ball, the cover compositions may be injection molded directly around the core while the core is positioned in the center of a golf ball mold at a temperature of about 350° F to about 450° F. In compression molding, the cover composition is first injection molded at about 380° F. to about 450° F. to provide smooth surfaced hemispherical shells. The shells are then positioned around the core in a dimpled golf ball mold and compression molded at about 230 to 300° F. for about 2 minutes to about 10 minutes at a pressure sufficient to retain the mold in a closed position. Thereafter, the mold is cooled at about 50° F. to about 70° F. for about 2 minutes to about 10 minutes to fuse the shells together to form a unitary ball. In a multi-layer golf ball, a mantle layer is molded over the core to form an intermediate golf ball. A cover is then molded over the intermediate golf ball as described with respect to two-layer golf balls. After molding, the resulting golf balls may undergo various further processing steps such as buffing, painting and marking.

The core itself may be of a uniform composition, or may have two or more layers. The standards for both the diameter and weight for golf balls are established by the United States Golf Association (U.S.G.A.). Although the compositions employed in the invention can be used in solid core, two-piece and wound balls, solid and two-piece balls are preferred over wound balls due to their lower cost and superior performance. The term "solid cores" as used herein refers not only to one piece cores but also to multi-layer cores.

Preferably, in a golf ball according to the invention, at least one layer of the golf ball contains at least one part by weight of a filler. Fillers preferably are used to adjust the density, flex modulus, mold release, and/or melt flow index of a layer. More preferably, at least when the filler is for adjustment of density or flex modulus of a layer, it is present in an amount of at least five parts by weight based upon 100 parts by weight of the layer's composition. With some fillers, up to about 200 parts by weight probably can be used.

A density adjusting filler according to the invention preferably is a filler which has a specific gravity which is at least 0.05 and more preferably at least 0.1 higher or lower than the specific gravity of the layer composition. Particularly preferred density adjusting fillers have specific gravities which are higher than the specific gravity of the resin composition by 0.2 or more, even more preferably by 2.0 or more.

A flex modulus adjusting filler according to the invention is a filler which when used in an amount of, e.g., 1 to 100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler.

A mold release adjusting filler is a filler which allows for the easier removal of a part from a mold, and eliminates or reduces the need for external release agents which otherwise could be applied to the mold. A mold release adjusting filler typically is used in an amount of up to about 2 weight percent based upon the total weight of the layer.

A melt flow index adjusting filler is a filler which increases or decreases the melt flow, or ease of processing of the composition.

The layers may contain coupling agents that increase adhesion of materials within a particular layer, e.g., to couple a filler to a resin composition, or between adjacent layers. Non-limiting examples of coupling agents include titanates, zirconates, aluminates and silanes. Coupling agents typically are used in amounts of 0.1 to 2 weight percent based upon the total weight of the composition in which the coupling agent is included.

A density adjusting filler is used to control the moment of inertia, and thus the initial spin rate of the ball and spin decay. The addition in one or more layers, and particularly in the outer cover layer of a filler with a lower specific gravity than the resin composition results in a decrease in moment of inertia and a higher initial spin rate than would result if no filler were used. The addition in one or more of the cover layers, and particularly in the outer cover layer, of a filler with a higher specific gravity than the resin composition results in an increase in moment of inertia and a lower initial spin rate. High specific gravity fillers are preferred as less volume is used to achieve the desired inner cover total weight. Non-reinforcing fillers are also preferred as they have minimal effect on C.O.R. Preferably, the filler does not chemically react with the resin composition to a substantial degree, although some reaction may occur when, for example, zinc oxide is used in a shell layer which contains some ionomer.

The density-increasing filler for use in the invention preferably has a specific gravity in the range of 1.0 to 20. The density-reducing fillers for use in the invention preferably have a specific gravity of 0.06 to 1.4, and more preferably 0.06 to 0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index decreasing fillers have an opposite effect due to their relatively low melt flow index versus the matrix.

Fillers which may be employed in layers other than the outer cover layer may be in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof.

The present invention is further illustrated by the following non-limiting examples set forth below. In many of the examples, the compositions are injection molded at 420 to 480° F. (depending upon nylon content) around identical solid cores which have a finished diameter of 1.545" to produce golf balls about 1.680" in diameter having a nominal cover thickness of 0.0675 inches. Each example represents the average data for one dozen balls produced according to the invention. The properties for the balls listed in the examples are measured according to the following procedures:

The resilience or coefficient of restitution (C.O.R.) of a golf ball is the constant "e," which is the ratio of the relative velocity of an elastic sphere after direct impact to that before impact. As a result, the C.O.R. ("e") can vary from 0 to 1, with 1 being equivalent to a perfectly or completely elastic collision and 0 being equivalent to a perfectly or completely inelastic collision.

C.O.R., along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (C.O.R.) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (C.O.R.) and the surface configuration (dimple pattern, ratio of land area to dimple area, etc.) of the ball.

The C.O.R. in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex., which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 0.2 inches thick.

As indicated above, the incoming speed should be 125+/−5 fps but corrected to 125 fps. The correlation between C.O.R. and forward or incoming speed has been studied and a correction has been made over the +/−5 fps range so that the C.O.R. is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Cold cracking resistance is measured by firing a ball, having been previously stored at 10° F. for 24 hours, at a velocity of 165 ft/sec from an air cannon against a steel plate positioned 12 feet from the muzzle of the cannon. The ball is fired 5 times against the plate. After allowing the ball to equilibrate to room temperature, the ball is visually inspected to identify cracks in the cover. One or more cracks, no matter how small, constitute failure.

The term "compression" utilized in the golf ball trade generally defines the overall deflection that a golf ball undergoes when subjected to a compressive load. For example, PGA compression indicates the amount of change in a golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70 to 110, preferably around 80 to 100.

In determining PGA compression using the 0 to 200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200 to 100) and a ball which deflects 0.110 inches (110×0.001 inches) has a PGA compression of 90 (i.e., 200 to 110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Philadelphia, Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression testers. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160−Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Figure 8:
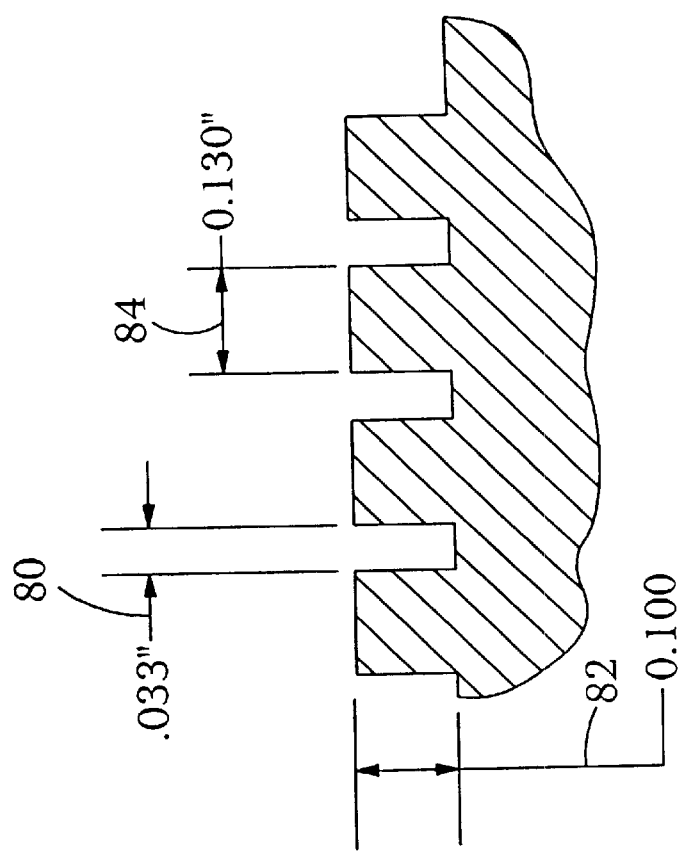
FIG. 8 is a partial side view of a portion of an insert plate in the durability test apparatus which has grooves intended to simulate a golf club face.
Figure 7:
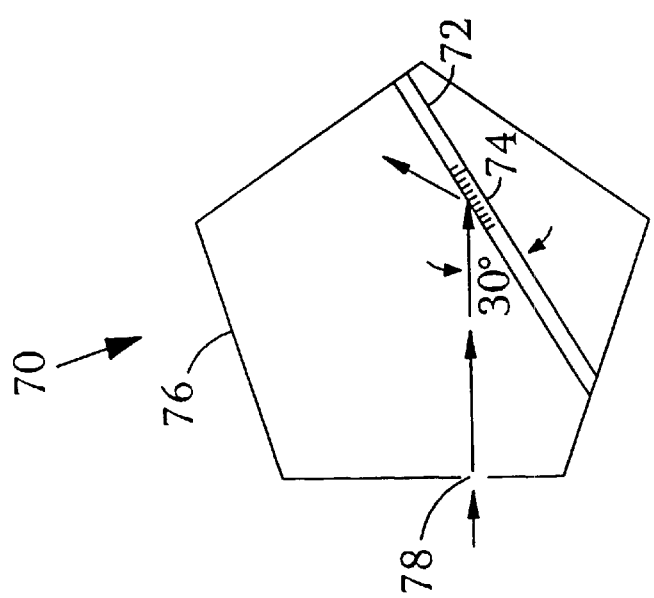
FIG. 7 schematically shows a durability test apparatus used to determine the durability of the golf balls of the invention.

Durability is determined by firing a golf ball at 135 ft/sec (at 72° F.) into 5-sided steel pentagonal container, the walls of which are steel plates. The container 70, which is shown schematically in FIG. 7, has a 19½ inch long insert plate 72 mounted therein, the central portion 74 of which has horizontally extending square grooves on it which are intended to simulate a square grooved face of a golf club. The grooves, which are shown in an exaggerated form in FIG. 8, have a width 80 of 0.033 inches, a depth 82 of 0.100 inches, and are spaced apart from one another by land areas 84 having a width of 0.130 inches. The five walls 76 of the pentagonal container each have a length of 14½ inches. The inlet wall is vertical and the insert plate is mounted such that it inclines upward 60° relative to a horizontal plane away from opening 78 in container 70. The ball travels 15½–15¾ inches horizontally from its point of entry into the container 70 until it hits the square-grooved central portion 74 of insert plate 72. The angle between the line of trajectory of the ball and the insert plate 72 is 30 degrees. The balls are subjected to 70 or more blows (firings) and are inspected at regular intervals for breakage (i.e., any signs of cover cracking or delamination). If a microcrack forms in a ball, its speed will change and the operator is alerted. The operator then visually inspects the ball. If the microcrack cannot yet be observed, the ball is returned to the test until a crack can be visually detected.

A ball is assigned a Durability Rating according to the following scale. A sample of twelve balls of the same type are obtained and are tested using the durability test apparatus described in the previous paragraph. If less than all of the balls in the sample survive 70 blows each without cracking, the ball is assigned a Durability Rating of 1. If all of the balls survive 70 blows and one or two of the twelve balls crack before 100 blows, the ball is assigned a Durability Rating of 2. If all twelve balls in the sample survive 100 blows each, but seven or more balls crack at less than 200 blows each, the ball is assigned a Durability Rating of 3. If all twelve balls in the sample survive 100 blows and at least six out of the twelve balls in the sample also survive 200 blows, the ball is assigned a Durability Rating of 4.

The spin rate of the golf ball is measured by striking the ball with a 9-iron wherein the club-head speed is about 105 feet per second and the ball is launched at an angle of from about 26 to about 34 degrees with an initial velocity of from about 110 to about 115 feet per second. The spin is measured by observing the rotation of the ball in flight using stop action strobe photography.

"Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

EXAMPLES 1–28

Use of Nylon-Containing Ionomers in Golf Ball Covers

By blending the ingredients set forth in the following Tables, cover compositions were produced and injection molded around a core to yield a two piece ball as described above. The balls were then evaluated. The results are shown below:

Examples 1–3

Examples 1–3 in Table 12 illustrate golf balls formed from compositions which include RP (CAPRON 8351) with ethylene/methyl acrylate/acrylic acid terpolymers (ESCOR ATX 325), and compositions formed from RP (CAPRON 8351) with Zn neutralized ethylene/methyl acrylate/acrylic acid terpolymer ionomers (IOTEK 7520, and IOTEK 7510). The cover material was blended in a single screw extruder. Cold cracking of Examples 1 and 2 may have been a result of molding problems.

TABLE 12

| Example/component (grams) | 1 | 2 | 3 |
|---|---|---|---|
| IOTEK 7520 | — | 1500 | — |
| IOTEK 7510 | — | — | 1500 |
| CAPRON 8351 | 1500 | 1500 | 1500 |
| ESCOR ATX 325 | 1500 | — | — |
| Cold Crack Resistance | 2 cracks at 2 blows 4 cracks at 3 blows | 2 cracks at 3 blows 3 cracks at 5 blows | — |
| Durability - 300 hits | No Failures | No Failures | |

Examples 4–9

Examples 4–9 in Table 13 show compositions of nylon homopolymers (CAPRON 8202) with ethylene/acrylic acid copolymer ionomers (IOTEK 7010 and IOTEK 8000), blends of ethylene/acrylic acid ionomers (IOTEK 7010 and IOTEK 8000), compositions of nylon homopolymers (CAPRON 8202) with terpolymers (ESCOR ATX 320) and terpolymer ionomers such as (ESCOR ATX-320-Li80), and of nylon homopolymers (CAPRON 8202) and terpolymers (ESCOR ATX 320) are shown. Blends A, B, C and D were each pre-extruded in a single screw extruder and were molded over cores having the same formulation, a Riehle compression in the range of 61–69 and a C.O.R. in the range of 0.766–0.778. Example 5 was a control in which no nylon was used. Examples 4 and 6–9 show that Nylon 6 can be blended with ionomeric copolymers to make a durable golf ball if sufficient mixing occurs. It was surprising that the inclusion of 10% nylon (Example 4) produced a cover that had nearly the same durability as Control Example 5. In Example 6, a preextrusion of zinc ionomer (IOTEK 7010) with nylon, followed by dry blending with sodium ionomer unexpectedly resulted in better durability than the balls of Example 4 although the covers of Examples 4 and 6 had the same overall composition. While the covers of Examples 7 and 8 were expected to break as a result of incompatibility, it was instead found that terpolymer and terpolymer ionomer were compatible with nylon, and no cracking occurred in the 300-blow durability test.

TABLE 13

| Example/Component (grams) | 4 | 5 (control) | 6 | 7 | 8 | 9 |
|---|---|---|---|---|---|---|
| Blend A[1] | 2000 | — | — | — | — | — |
| Blend B[2] | — | — | — | — | 2000 | — |
| Blend C[3] | — | — | — | 2000 | — | — |
| Blend D[4] | — | — | 650 | — | — | 1000 |
| IOTEK 8000 | — | 1500 | 1350 | — | — | — |
| IOTEK 7010 | — | 500 | — | — | — | — |
| Compression (Riehle) | 59 | 60 | 59 | 74 | 75 | 60 |
| Coefficient of Restitution | 0.804 | 0.805 | 0.806 | 0.783 | 0.767 | 0.798 |
| Durability[5] | | | | | | |
| 100 blows | 12 | 12 | 12 | 12 | 12 | 12 |
| 200 blows | 12 | 12 | 12 | 12 | 12 | 12 |
| 300 blows | 7 | 8 | 9 | 12 | 12 | 5 |

[1]Sample taken from mixture of 2025 g IOTEK 8000, 675 g IOTEK 7010, and 300 g CAPRON 8202.
[2]Sample taken from mixture of 2700 g ESCOR ATX 320 and 300 g CAPRON 8202.
[3]Sample taken from mixture of 1350 g ESCOR ATX 320, 1350 g ESCOR ATX 320-Li-80, and 300 g CAPRON 8202.
[4]Sample taken from mixture of 1350 g IOTEK 7010 and 600 g CAPRON 8202.
[5]Number of balls out of 12 which survived 100 blows, 200 blows and 300 blows

Examples 10–14

Examples 10–14 in Table 14 illustrate compositions which employ one or more copolymer ionomers (IOTEK, SURLYN) with ZYTEL. These compositions were prepared and molded into golf balls according to the procedures above. The materials were blended using a single screw extruder. Example 11 produced the "best" ball of this set of Examples due to its high C.O.R.

TABLE 14

| Example/ Component | 10 | 11 | 12 | 13 | 14 |
|---|---|---|---|---|---|
| IOTEK 4000 | 35 wt. % | 42.5 wt. % | — | — | — |
| IOTEK 8000 | 35 wt. % | 42.5 wt. % | — | — | — |
| SURLYN 9910 | — | — | 85 wt. % | — | — |
| SURLYN 9320 | — | — | — | 75 wt. % | 50 wt. % |
| ZYTEL 408 | 30 wt. % | 15 wt. % | 15 wt. % | 25 wt. % | 50 wt. % |
| C.O.R. | 0.784 | 0.812 | 0.803 | 0.784 | 0.782 |
| Compression (Riehle) | 53 | 54 | 56 | 65 | 61 |

TABLE 14-continued

| Example/Component | 10 | 11 | 12 | 13 | 14 |
|---|---|---|---|---|---|
| Hardness Shore D | 70 | 70 | 67 | 50 | 62 |

Example 15

Example 15 illustrates use of RP in the form of CAPRON 8351 as the cover of a golf ball. The core had a Riehle compression in the range of 85–95 and a C.O.R. in the range of 0.772–0.789 and was the same type of core as was used in Examples 16–44. The performance of this ball is shown in Table 17. The resulting ball had low spin and high hardness, which would make it useful for a high handicap player.

Examples 16–20

RP (CAPRON 8351) was admixed with blend BX1 that included a Na neutralized ethylene/acrylic acid copolymer ionomer, a first Zn neutralized ethylene/acrylic acid copolymer ionomer, and a component mixture (masterbatch). The component mixture included a second Zn neutralized ethylene/acrylic acid copolymer ionomer. The second Zn neutralized ethylene/acrylic acid ionomer was different from the first Zn neutralized ethylene/acrylic acid copolymer ionomer.

More specifically, in Examples 16–20, CAPRON 8351 was blended with blend BX1. In blend BX1, the first Na neutralized ethylene/acrylic acid copolymer ionomer was IOTEK 8000 in an amount of 70 wt. % of blend BX1. The first Zn neutralized ethylene/acrylic acid copolymer ionomer was IOTEK 7010 in an amount of 20 wt. % of blend BX1. The component mixture formed 10 wt. % of blend BX1. The component mixture contained IOTEK 7030 as the second Zn neutralized ethylene/acrylic acid copolymer ionomer in an amount of 75 wt. % of the component mixture. The component mixture also included 24 wt. % of UV stabilizer, 0.26 wt. % brightener, 0.46 wt. % dye and 0.04 wt. % antioxidant. Blend BX1 was produced by dry blending the Na and Zn copolymer ionomers with the component mixture. The component mixture employed in the blend BX1 was produced by melt extruding the ingredients of the component mixture at a temperature of about 380° F. Mixing of RP and blend BX1 took place using a twin screw extruder designed for intensive mixing. The RP was melt mixed with blend BX1 at a temperature of about 450° F. The resulting compositions then were molded into covers and balls as described above. The performance of balls according to Examples 16–20 is shown in Table 17.

Stated more generally, when CAPRON 8351 and blend BX1 are used to form a golf ball cover, CAPRON 8351 is from about 1 to about 99 wt. %, preferably from about 20 wt. % to about 80 wt. %, more preferably about 20 wt. % of the composition, and blend BX1 is from about 1 to about 99 wt. %, preferably from about 20 to about 80 wt. % of the composition, more preferably about 80 wt. % of the composition. In blend BX1, the first Zn neutralized ethylene/acrylic acid copolymer ionomer is from about 1 to about 90 wt. %, preferably about 20 wt. % of blend BX1, the Na neutralized ethylene/acrylic acid copolymer ionomer is from about 1 to about 90 wt. %, preferably about 70 wt. % of blend BX1, and the component mixture is from about 1 to about 30 wt. %, preferably about 10 wt. % of blend BX1. Preferably, the second Zn neutralized ethylene/acrylic acid copolymer ionomer in the component mixture is about 75 wt. % of the component mixture, with the remainder being additives such as stabilizers for oxidative degradation, stabilizers for thermal degradation, stabilizers for ultraviolet light degradation, inhibitors for oxidative degradation, inhibitors for thermal degradation, inhibitors for ultraviolet light degradation, lubricants, plasticizers, dyes, pigments, fibrous fillers, particulate fillers, and reinforcement nucleating agents. In this embodiment, a wide variety of Na ionomers including but not limited to those listed herein, preferably IOTEK 8000, may be employed. The first Zn copolymer ionomer may be, for example, any of those listed herein, preferably IOTEK 7010. The second Zn copolymer ionomer may be, for example, any of those listed herein, preferably IOTEK 7030. The aforesaid component mixture preferably includes about 75 wt. % IOTEK 7030, remainder additives.

As shown by the results in Table 17, the addition of nylon increased the hardness and C.O.R. of the balls, increased distance slightly, and reduced spin. It is important to note that the mixture of CAPRON 8351 with ionomer resulted in a highly durable product except in Example 17, in which the balls broke early. The poor results of Example 17 may have been caused by inadequate molding.

Examples 21–24

RP (CAPRON 8351) and blend BX2 that includes a Na neutralized ethylene/acrylic acid copolymer ionomer, a Zn neutralized ethylene/acrylic acid copolymer ionomer, and the above described component mixture were employed in a golf ball as a golf ball cover. Mixing of RP and blend BX2 took place using a twin screw extruder designed for intensive mixing.

In Examples 21–24, the first Zn neutralized ethylene/acrylic acid copolymer ionomer was EX1003 in an amount of 45% of blend BX2, the Na neutralized ethylene/acrylic acid copolymer ionomer was EX1002 in an amount of 45 wt. % of blend BX2, and the component mixture was 10 wt. % of blend BX2. The second Zn neutralized ethylene/acrylic acid copolymer ionomer in the component mixture was IOTEK 7030 in an amount of 75 wt. % of the component mixture. The component mixture also included 24 wt. % UV stabilizer, 0.26 wt. % brightener, 0.46 wt. % dye and 0.04 wt. % antioxidant. The performance of balls with these covers is shown in Examples 21–24 of Table 17.

Stated more generally, in this embodiment, CAPRON 8351 is about from about 1 to about 99 wt. %, preferably from about 20 to about 80 wt. %, more preferably about 20 wt. % of the composition, and blend BX2 is from about 1 to about 99 wt. %, preferably from about 20 to about 80 wt. %, more preferably about 80 wt. % of the composition. In blend BX2, the Na neutralized ethylene/acrylic acid copolymer ionomer is from about 1 to about 90 wt. %, preferably about 45 wt. % of blend BX2, the Zn neutralized ethylene/acrylic acid copolymer ionomer is from about 1 to about 90 wt. %, preferably about 45 wt. % of blend BX2, and the component mixture is from about 1 to about 30 wt. %, preferably about 10 wt. % of blend BX2. In this embodiment, the preferred Na neutralized ionomer is EX1002 and the preferred Zn ionomer is EX1003. EX1002 and EX1003 are provided by Exxon Chemical Co. and the properties of EX1002 and EX1003 are shown in Table 15 below.

TABLE 15

| Resin/Property | ASTM Method | EX 1002 | EX 1003 |
|---|---|---|---|
| Cation | | Na | Zn |
| Melt Index (g/10 min) | D-1235 | 1.6 | 1.1 |
| Melting Point (C) | D-3417 | 83.7 | 82 |
| Crystallization Point (C) | D-3417 | 43.2 | 51.5 |
| Plague Properties (2 mm thick compression molding) | | | |
| Tensile Strength at Break MPa | D-638 | 31.7 | 24.8 |
| Yield Point MPa | D-638 | 22.5 | 14.9 |
| Elongation at Break % | D-638 | 348 | 387 |
| 1% Secant Modulus MPa | D-638 | 418 | 145 |
| 1% Flexural Modulus MPa | D-790 | 380 | 147 |
| Shore D Hardness | D-2240 | 62 | 54 |
| Vicat Softening Point | D-1525 | 51.5 | 56 |

EX1002 is made by neutralizing an ethylene/acrylic acid copolymer having about 18 wt. % acrylic acid and a melt index of about 28 with Na to achieve a Na neutralized ethylene/acrylic acid copolymer ionomer that has a melt index of about 1. EX1003 is made by neutralizing an ethylene/acrylic acid copolymer having about 18 wt. % acrylic acid having a melt index of about 28 with Zn to yield a Zn neutralized ethylene/acrylic acid ionomer having a melt index of about 1. Blend BX2 is made in the manner employed to make blend BX1. CAPRON 8351 and blend BX2 then are blended together. The resultant compositions then are formed into golf ball covers and golf balls as described above.

As was the case in Examples 16–20, Examples 21–24 also show that the addition of nylon increases the hardness and C.O.R. of the golf balls, and increases distance slightly while reducing spin.

Examples 25–28

RP (CAPRON 8351) with blend BX3 that included a Na neutralized ethylene/acrylic acid copolymer ionomer, a Zn neutralized ethylene/acrylic acid copolymer ionomer, and the above described component mixture were employed in a golf ball as a golf ball cover. Mixing of RP with blend BX3 was conducted using a twin screw extruder designed for intensive mixing. In Examples 25–28, the first neutralized ethylene/acrylic acid copolymer ionomer was EX 990 in an amount of 45 wt. % of blend BX3, the Na neutralized ethylene/acrylic acid copolymer ionomer was EX 989 in an amount of 45 wt. % of blend BX3, and the component mixture was 10 wt. % of blend BX3. The second Zn neutralized ethylene/acrylic acid copolymer ionomer in the component mixture was IOTEK 7030 in an amount of 75 wt. % of the component mixture. The component mixture also included 24 wt. % UV stabilizer, 0.26 wt. % brightener, 0.46 wt. % dye and 0.04 wt. % antioxidant. The properties of EX 989 and EX 990, as provided by Exxon, are shown in Table 16. The performance of balls with covers of these compositions is shown in Examples 25–28 of Table 17.

Stated more generally, in this embodiment, CAPRON 8351 is about from 1 to about 99 wt. %, preferably from about 20 to about 80 wt. %, more preferably about 20 wt. % of the composition, and blend BX3 is from about 1 to about 99 wt. %, preferably from about 20 to about 80 wt. %, more preferably about 80 wt. % of the composition. In blend BX3, the Na neutralized ethylene/acrylic acid copolymer ionomer is from about 1 to about 90 wt. %, preferably about 45 wt. % of blend BX3, the first Zn neutralized ethylene/acrylic acid copolymer ionomer is from about 1 to about 90 wt. %, preferably about 45 wt. % of blend BX3, and the component mixture is from about 1 to about 30 wt. %, preferably about 10 wt. % of blend BX3. In this embodiment, the preferred Na ionomer is EX 989. The preferred Zn copolymer ionomer is EX 990. EX 989 is made by neutralizing an ethylene/acrylic acid copolymer that has about 18 wt. % acrylic acid and a melt index of about 100 with Na. EX 990 is made by neutralizing an ethylene/acrylic acid copolymer that has about 18 wt. % acrylic acid and a melt index of about 100 with Zn. EX 989 and EX 990 are available from Exxon Chemical Co.

As indicated by the results on Table 17, CAPRON 8351 produces a golf ball with excellent durability, as well as a very high coefficient of restitution and good distance, when used in combination with BX3.

Examples 20, 21 and 25 were controls. In each set of Examples 16–20, 21–24 and 25–28, intermolecular interactions are believed to have caused, or at least contributed to, the reduction in melt index for the blends as compared to the pure materials. Durability of the covers containing 20 wt. % CAPRON 8351 is better than durability of covers containing 40 wt. % CAPRON 8351. However, the 40 wt. % CAPRON 8351 covers met the durability standard for commercial golf balls and resulted in a harder cover.

TABLE 16

| Resin/Property | EX 989 | EX 990 |
|---|---|---|
| Melt Index (g/10 min) | 1.3 | 1.24 |
| Cation type | Na | Zn |
| Density (kg/m$^3$) | 959 | 977 |
| Vicat Softening Temp. (C.) | 52/5 | 55.0 |
| Crystallization Temp. (C.) | 40.1 | 54.4 |
| Melting Point (C) | 92.6 | 81.0 |
| Tensile at Yield (MPa) | 23.8 | 16.5 |
| Tensile at Break (MPa) | 32.3 | 23.8 |
| Elongation at Break (%) | 330 | 357 |
| 1% Secant Modulus (MPa) | 389 | 205 |
| Flexural Modulus (MPa) | 340 | 183 |
| Hardness (Shore D) | 62 | 56 |
| Zwick Rebound (%) | 61 | 48 |

TABLE 17

| EX. | % BX3 | % BX2 | % BX1 | % C8351 | MOLD TEMP[1] | ME[2] | SIZE[3] | Wt.[4] | COMP[5] | COR[6] | HARD[7] | SPIN[8] | DIST | DUR[9] | 100[10] blows | 200[11] blows | 300[12] blows |
|---|---|---|---|---|---|---|---|---|---|---|---|---|---|---|---|---|---|
| 15 | | | 0 | 100 | 465 | 5.51 | 1.679 | 45.92 | 56 | 808 | 77 | 5514 | 251.3** | 258 | 12 | 10 | 9 |
| 16 | | 20 | | 80 | 465 | 3.13 | 1.677 | 45.57 | 60 | 801 | 75 | 5984 | 248.1** | 155 | 9 | 2 | 0 |
| 17 | | 40 | | 60 | 460 | 0.43 | 1.68 | 45.52 | 65 | B[13] | 73 | 6891 | 234.0** | —[13] | — | — | — |

TABLE 17-continued

| EX. | % BX3 | % BX2 | % BX1 | % C8351 | MOLD TEMP[1] | ME[2] | SIZE[3] | Wt.[4] | COMP[5] | COR[6] | HARD[7] | SPIN[8] | DIST | DUR[9] | 100[10] blows | 200[11] blows | 300[12] blows |
|---|---|---|---|---|---|---|---|---|---|---|---|---|---|---|---|---|---|
| 18 | | | 60 | 40 | 450 | 0.9 | 1.68 | 45.41 | 71 | 803 | 72 | — | 248.8** | 197 | 12 | 6 | 0 |
| 19 | | | 80 | 20 | 430 | 3.23 | 1.68 | 45.27 | 73 | 806 | 69 | 7777 | 249.6** | 278 | 12 | 12 | 4 |
| 20 | | | 100 | 0 | 430 | 9.49 | 1.68 | 45.13 | 75 | 807 | 67 | 8375 | 248.1** | 335 | 12 | 12 | 8 |
| 21 | | 100 | | 0 | 430 | 17.5 | 1.679 | 45.22 | 68 | 821 | 72 | 7028 | 264.7** | 171 | 12 | 0 | 0 |
| 22 | | 80 | | 20 | 430 | 7.5 | 1.68 | 45.3 | 66 | 818 | 73 | 6988 | 263.8* | 239 | 12 | 5 | 5 |
| 23 | | 60 | | 40 | 450 | 1.45 | 1.681 | 45.6 | 65 | 815 | 74 | 6434 | 262.8* | 139 | 9 | 1 | 0 |
| 24 | | 40 | | 60 | 460 | 0.62 | 1.678 | 45.56 | 61 | 781 | 75 | 6300 | 264.2* | —[13] | — | — | — |
| 25 | 100 | | | 0 | 430 | 15.8 | 1.68 | 45.26 | 68 | 819 | 72 | 6707 | 266.0* | 157 | 12 | 1 | 0 |
| 26 | 80 | | | 20 | 430 | 8.08 | 1.68 | 45.32 | 67 | 819 | 73 | 6842 | 265.0* | 253 | 12 | 7 | 4 |
| 27 | 60 | | | 40 | 430 | 2.8 | 1.679 | 45.38 | 66 | 816 | 75 | 6257 | 266.1* | 172 | 11 | 2 | 0 |
| 28 | 40 | | | 60 | 460 | 1.39 | 1.681 | 45.73 | 62 | 813 | 77 | 6013 | 264.7* | 55 | 1 | 0 | 0 |

[1] Degrees F.
[2] Melt Index-g/10 min
[3] Diameter in inches
[4] Weight in grams
[5] Riehle Compression
[6] Coefficient of Restitution
[7] Hardness-Shore D
[8] revs. per min.
[9] Durability-Average No. of hits to failure
[10] Number of balls out of 12 which survived 100 blows
[11] Number of balls out of 12 which survived 200 blows
[12] Number of balls which out of 12 which survived 300 blows
[13] Broke
*Yards total distance after impact with Top Flight Tour metal wood having 10.5 Deg. loft at 157.96 ft/sec onto firm turf
**Yards total distance after impact with Top Flight Tour metal wood having 12 Deg. loft at 163.3 ft/sec onto soft turf

EXAMPLES 29–44

Use of Blends of Copolymer Ionomer and Nylon in Golf Ball Covers

Examples 29–34

CAPRON 8202 with the aforementioned blend BX1 was employed as a cover in a golf ball. The CAPRON 8202 and blend BX1 were mixed using a twin screw extruder designed for intensive mixing.

In Examples 29–34, the Na neutralized ethylene/acrylic acid copolymer ionomer was IOTEK 8000 in an amount of 70 wt. % of blend BX1, the first Zn neutralized ethylene/acrylic acid copolymer ionomer was IOTEK 7010 in an amount of 20 wt. % of blend BX1, and the component mixture is 10 wt. % of blend BX1. The second Zn neutralized ethylene/acrylic acid copolymer ionomer in the component mixture was IOTEK 7030 in an amount of 75 wt. % of the component mixture. The component mixture also included 24 wt. % of UV stabilizer, 0.26 wt. % brightener, 0.46 wt. % dye and 0.04 wt. % antioxidant. The performance of balls which employ those covers is shown as Examples 29–34 in Table 18 below.

Stated more generally, in this embodiment, CAPRON 8202 is from about 1 to about 50 wt. %, preferably from about 20 to about 50 wt. %, more preferably about 20 wt. % of the composition, and blend BX1 is from about 50 to about 99 wt. %, preferably from about 50 to about 80 wt. %, more preferably about 80 wt. % of the composition as long as a Durability Rating of at least 2 is obtained. The compositions are formed into golf ball covers and golf balls as described above.

TABLE 18

| EX. | % BX3 | % BX2 | % BX1 | % C8351 | MOLD TEMP[1] | ME[2] | SIZE[3] | Wt.[4] | COMP[5] | COR[6] | HARD[7] | SPIN[8] | DIST | DUR[9] | 100[10] blows | 200[11] blows | 300[12] blows |
|---|---|---|---|---|---|---|---|---|---|---|---|---|---|---|---|---|---|
| 29 | | | 0 | 100 | 465 | 14.38 | 1.68 | 46.3 | 43 | B[13] | 80 | 7412 | — | —[13] | — | — | — |
| 30 | | | 20 | 80 | 465 | 15.9 | 1.68 | 46.02 | 50 | B[13] | 78 | — | — | —[13] | — | — | — |
| 31 | | | 40 | 60 | 460 | 5.32 | 1.68 | 45.76 | 57 | B[13] | 75 | — | — | —[13] | — | — | — |
| 32 | | | 60 | 40 | 450 | 1.73 | 1.68 | 45.54 | 67 | 808 | 72 | 7056 | 251.6** | 69 | 1 | 0 | 0 |
| 33 | | | 80 | 20 | 430 | 5.68 | 1.68 | 45.4 | 71 | 809 | 70 | 7845 | 250.9** | 178 | 12 | 2 | 0 |
| 34 | | | 100 | 0 | 430 | 9.49 | 1.68 | 45.13 | 75 | 807 | 67 | 8375 | 248.1** | 335 | 12 | 12 | 8 |
| 35 | | 100 | | 0 | 430 | 17.5 | 1.68 | 45.22 | 68 | 821 | 72 | 7028 | 264.7* | 171 | 12 | 0 | 0 |
| 36 | | 80 | | 20 | 430 | 6.23 | 1.68 | 45.44 | 66 | 821 | 73 | 6375 | 265.5* | 103 | 11 | 0 | 0 |
| 37 | | 60 | | 40 | 450 | 2.21 | 1.68 | 45.33 | 63 | 821 | 75 | 5826 | 265.8* | 93 | 9 | 0 | 0 |
| 38 | | 40 | | 60 | 460 | 7.49 | 1.68 | 45.96 | 54 | B[13] | 80 | 4708 | — | —[13] | — | — | — |
| 39 | | 0 | | 100 | 465 | 14.38 | 1.68 | 46.3 | 43 | B[13] | 80 | 7412 | — | —[13] | — | — | — |
| 40 | 100 | | | 0 | 430 | 15.8 | 1.68 | 45.26 | 68 | 819 | 72 | 6707 | 266* | 157 | 12 | 1 | 0 |
| 41 | 80 | | | 20 | 430 | 6.88 | 1.79 | 45.39 | 66 | 821 | 74 | 6607 | 266.5* | 186 | 12 | 3 | 1 |
| 42 | 60 | | | 40 | 450 | 3.86 | 1.68 | 45.67 | 62 | 824 | 77 | 5656 | 267.1** | 150 | 12 | 1 | 0 |

TABLE 18-continued

| EX. | % BX3 | % BX2 | % BX1 | % C8351 | MOLD TEMP[1] | ME[2] | SIZE[3] | Wt.[4] | COMP[5] | COR[6] | HARD[7] | SPIN[8] | DIST | DUR[9] | 100[10] blows | 200[11] blows | 300[12] blows |
|---|---|---|---|---|---|---|---|---|---|---|---|---|---|---|---|---|---|
| 43 | 40 | | | 60 | 460 | 7.49 | 1.683 | 45.92 | 53 | B[13] | 80 | B[13] | — | —[13] | — | — | — |
| 44 | 0 | | | 100 | 465 | 14.38 | 1.68 | 46.3 | 43 | B[13] | 80 | 7412 | — | [13] | — | — | — |

[1]Degrees F.
[2]Melt Index-g/10 min
[3]Diameter in inches
[4]Weight in grams
[5]Riehle Compression
[6]Coefficient of Restitution
[7]Hardness-Shore D
[8]RPM
[9]Durability-Average No. of hits to failure
[10]Number of balls out of 12 which survived 100 blows
[11]Number of balls out of 12 which survived 200 blows
[12] Number of balls which out of 12 which survived 300 blows
[13]Broke
*Yards total distance after impact with Top Flight Tour metal wood having 10.5 Deg. loft at 157.96 ft/sec onto firm turf
**Yards total distance after impact with Top Flight Tour metal wood having 12 Deg. loft at 163.3 ft/sec onto soft turf Examples 35–39

CAPRON 8202 with the aforementioned blend BX2 was employed as a cover in a golf ball. The CAPRON 8202 and blend BX2 were mixed using a twin screw extruder designed for intensive mixing.

In Examples 35–39, the Na neutralized ethylene/acrylic acid copolymer ionomer was EX 1002 in an amount of 45 wt. % of blend BX2, the first Zn neutralized ethylene/acrylic acid copolymer ionomer was EX 1003 in an amount of 45 wt. % of blend BX2, and the component mixture was 10 wt. % of blend BX2. The second Zn neutralized ethylene/acrylic acid copolymer ionomer in the component mixture was IOTEK 7030 in an amount of 75 wt. % of the component mixture. The component mixture also included 24 wt. % UV stabilizer, 0.26 wt. % brightener, 0.46 wt. % dye and 0.04 wt. % antioxidant. The performance of balls with those covers is shown in Examples 35–39 of Table 18 above.

Stated more generally, in this embodiment, CAPRON 8202 is from about 1 to about 50 wt. %, preferably from about 20 to about 50 wt. %, more preferably about 20 wt. % of the composition, and blend BX2 is from about 50 to about 99 wt. %, preferably from about 50 to about 80 wt. %, more preferably about 80 wt. % of the composition as long as a minimal Durability Rating of 2 is obtained. The compositions are formed into golf ball covers and golf balls as described above.

Examples 40–44

CAPRON 8202 with blend BX3 was employed as a golf ball cover of a golf ball. The CAPRON 8202 and blend BX3 were mixed using a twin screw extruder designed for intensive mixing. In Examples 40–44, the first Zn neutralized ethylene/acrylic acid copolymer ionomer was EX 990 in an amount of 45 wt. % of blend BX3, the Na neutralized ethylene/acrylic acid copolymer ionomer was EX 989 in an amount of 45 wt. % of blend BX3, and the component mixture was 10 wt. % of blend BX3. The second Zn neutralized ethylene/acrylic acid copolymer ionomer in the component mixture was IOTEK 7030 in an amount of 75 wt. % of the component mixture. The component mixture also included 24 wt. % UV stabilizer, 0.26 wt. % brightener, 0.46 wt. % dye and 0.04 wt. % antioxidant. The performance of balls with those covers is shown in Examples 40–44 of Table 18 above.

Stated more generally, in this embodiment, CAPRON 8202 is from about 1 to about 50 wt. %, preferably from about 20 to about 50 wt. %, more preferably about 20 wt. % of the composition, and blend BX3 is from about 50 to about 99 wt. %, preferably from about 50 to about 80 wt. %, more preferably 80 wt. % of the composition as long as a minimal Durability Rating of 2 is obtained. The compositions are formed into golf ball covers and golf balls as described above.

EXAMPLES 45–59

Use of Blends of Terpolymer Ionomer and Nylon in Golf Ball Covers

CAPRON 8351 was blended in different amounts with four different ionomeric or non-ionomeric terpolymers, namely SURLYN 9320, IOTEK 7520, ATX 320-Li-40 and DS3076 (Chevron Chemical Co.). DS3076 is an extrusion grade sodium ionomer resin with a melt index of 0.5 g/10 min (ASTM D-1238) and a flexural modulus of 34,400 psi (ASTM D-790-66). Blending took place in a twin screw extruder designed for intensive mixing. The weight percentages of CAPRON 8351 and the terpolymer materials are shown on Table 19 below. The blend was employed as a cover of a golf ball. The covers were placed over cores having the same formulation, Riehle compression in the range of 82 to 92, and C.O.R. in the range of 0.785 to 0.805. The physical properties and performance of the resulting balls is shown on Table 19. The inclusion of nylon increased cover hardness and reduced ball spin.

On Table 19, scuff resistance measurements were determined as follows: A Top Flite® tour pitching wedge (1994) with box grooves was obtained and was mounted in a Miyamae™ driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a club head speed of 125 feet per second. A minimum of three samples of each ball were tested. Each ball was hit three times. After testing, the balls were rated according to the following table:

| Rating | Type of Damage |
| --- | --- |
| Little or no damage (groove markings or dents) | 1 |
| Small cuts and/or ripples in cover | 2 |
| Moderate amount of material lifted from ball surface but still attached to ball | 3 |
| Material removed or barely attached | 4 |

The balls that were tested were primed and top coated.

The addition of nylon caused a slight reduction in scuff resistance in Examples 45–48 and 49–52. However, Examples 45 and 49–51 were found to have a scuff resistance that was better than a number of commercially available "soft" golf balls, which typically have a scuff resistance of about 1.0. The "best balls" in this set of Examples were those of Examples 50–51 because they had a soft feel (i.e. low Shore D and relatively high spin) in conjunction with good scuff resistance.

Examples 45, 49, 53 and 57 were controls. As indicated by the results on Table 19, the golf balls of Examples 46–48, 50–51 and 54–56 possessed good cold crack resistance. Example 52 was believed to fail because of poor/inadequate molding. The formations of Examples 57–59 could not be molded due to difficulties during the extrusion process.

EXAMPLES 60–68

Use of Blends of Lithium Ionomer and Nylon in Golf Ball Covers

CAPRON 8202 and CAPRON 8351 were blended with various ionomers. In some of the Examples, all of the CAPRON and ionomers were pre-dried and co-extruded. In other Examples, the CAPRON was predried and preextruded with one ionomer and subsequently dry blended with another ionomer. A single screw extruder was used. The results are shown on Table 20.

As indicated by the results on Table 20, blends of nylon with lithium ionomers resulted in good durability. Example 63 shows a golf ball with particularly high durability. Core type A had a Riehle compression in the range of 68 to 76 and a C.O.R. in the range of 0.795 to 0.805. Core type B had a Riehle compression in the range of 54 to 62 and a C.O.R. in the range of 0.789 to 0.797.

TABLE 19

| EX. | % 9320 | % 7520 | % ATX | % DS3076 | % C8351 | MOLD TEMP | MI | SIZE | Wt. | COMP |
| --- | --- | --- | --- | --- | --- | --- | --- | --- | --- | --- |
| 45 | 100 | | | | 0 | | 3.7 | 1.6790 | 45.35 | 80 |
| 46 | 90 | | | | 10 | | 2.3 | 1.6790 | 45.55 | 81 |
| 47 | 80 | | | | 20 | | 1.4 | 1.680 | 45.58 | 79 |
| 48 | 70 | | | | 30 | | 0.6 | 1.6790 | 45.68 | 78 |
| 49 | | 100 | | | 0 | | 6.7 | 1.680 | 45.52 | 80 |
| 50 | | 90 | | | 10 | | 5.1 | 1.681 | 45.63 | 80 |
| 51 | | 80 | | | 20 | | 3.6 | 1.681 | 45.67 | 80 |
| 52 | | 70 | | | 30 | | 2.6 | 1.681 | 45.77 | 78 |
| 53 | | | 100 | | 0 | | 3.1 | 1.679 | 45.37 | 80 |
| 54 | | | 90 | | 10 | | 1.5 | 1.679 | 45.44 | 79 |
| 55 | | | 80 | | 20 | | 1.2 | 1.680 | 45.60 | 79 |
| 56 | | | 70 | | 30 | | 0.8 | 1.680 | 45.65 | 78 |
| 57 | | | | 100 | 0 | | | | | |
| 58 | | | | 90 | 10 | | | | | |
| 59 | | | | 80 | 20 | | | | | |

| EX. | C.O.R. | HARD[1] | SPIN | DIST D[2] | DIST I[3] | CC[4] CC[4] | SCUFF[5] | DUR[6] |
| --- | --- | --- | --- | --- | --- | --- | --- | --- |
| 45 | 781 | 71 | 10550 | 248 | 173 | NF | 0.5 | NF |
| 46 | 781 | 74 | 10299 | 247 | 175 | NF | 1.5 | NF |
| 47 | 782 | 75 | 10086 | 248 | 175 | NF | 3.0 | NF |
| 48 | 782 | 80 | 9549 | 248 | 177 | NF | 2.0 | NF |
| 49 | 781 | 69 | 10622 | 242 | 172 | NF | 0.5 | NF |
| 50 | 781 | 70 | 10578 | 247 | 173 | NF | 1.0 | NF |
| 51 | 779 | 74 | 10468 | 248 | 174 | NF | 1.0 | NF |
| 52 | 780 | 80 | 10245 | 248 | 175 | 1e3[7] | 1.5 | NF |
| 53 | 782 | 74 | 10405 | 245 | 176 | 1e3[7] | 1.5 | NF |
| 54 | 783 | 76 | 10318 | 247 | 177 | NF | 3.0 | NF |
| 55 | 783 | 80 | 10147 | 250 | 176 | NF | 4.0 | NF |
| 56 | 783 | 84 | 9559 | 249 | 178 | NF | 4.5 | NF |
| 57 | | | | | | | | |
| 58 | | | | | | | | |
| 59 | | | | | | | | |

[1]Shore C hardness
[2]yards, with driver
[3]yards, with 9-iron
[4]cold crack
[5]scuff resistance
[6]NF = 12/12 balls survived 20 blows in C.O.R. machine at 150–160 ft/sec.
[7]one break at third blow (most possibly due to molding)

TABLE 20

| | Pre-dried and Co-extruded | | | | | Dry Blended | | | | | | | | |
|---|---|---|---|---|---|---|---|---|---|---|---|---|---|---|
| EX | % 996 LI | % 996 Na | % 7010 | % BX1 | % 8351 | % 8202 | % 7010 | % 996 Li | COMP | C.O.R. | CORE TYPE | 100[1] blows | 200[2] blows | 300[3] blows | DUR[4] |
| 60 | 50 | | 33.3 | | | 16.7 | | | 59 | 826 | A | 12 | 7 | 3 | 257 |
| 61 | 50 | | | | | 16.7 | 33.3 | | 58 | 826 | A | 12 | 10 | 3 | 273 |
| 62 | | | 33.3 | | | 16.7 | | 50 | 59 | 826 | A | 12 | 11 | 5 | 261 |
| 63 | 50 | | 33.3 | | 16.7 | | | | 59 | 824 | A | 12 | 12 | 8 | >300 |
| 64 | | | | 100 | | | | | 60 | 822 | A | 12 | 12 | 11 | >300 |
| 65 | 50 | | 33.3 | | 16.7 | | | | 49 | 810 | B | 12 | 11 | 10 | >300 |
| 66 | | | | 100 | | | | | 50 | 806 | B | 12 | 12 | 11 | >300 |
| 67 | | 50 | | | | 16.7 | 33.3 | | 57 | 825 | A | 12 | 8 | 6 | 258 |
| 68 | | 50 | 33.3 | | 16.7 | | | | 59 | 824 | A | 12 | 11 | 3 | 245 |

[1]Number of balls out of 12 which survived 100 blows
[2]Number of baits out of 12 which survived 200 blows
[3]Number of balls out of 12 which survived 300 blows
[4]Durability - average number of hits to failure

EXAMPLES 69–96

Use of Small Quantities of Nylon in Ionomeric Golf Ball Covers

A number of blends were made using up to 30 wt. % CAPRON 8351 or 10 wt. % CAPRON 8202. The cores were of the same formulation as those of Examples 15–28. A twin screw extruder was used for blending. The results are shown on Table 21.

As shown on Table 21, all of the samples exhibited good durability and had good C.O.R.

TABLE 21

| Ex. # | % Ionomer | % 8351 | % 8202 | COMP | C.O.R. | Shore D | Cold Crack | 100[1] blows | 200[2] blows | 300[3] blows | MI |
|---|---|---|---|---|---|---|---|---|---|---|---|
| Ionomer Resin is a dryblend of 8000/7010 75/25 | | | | | | | | | | | |
| 69 | 100 | 0 | | 68 | 800 | 70 | nb | 12 | 12 | 7 | 5.3 |
| 70 | 90 | 10 | | 66 | 801 | 71 | nb | 12 | 12 | 4 | 3.1 |
| 71 | 80 | 20 | | 66 | 801 | 72 | nb | 12 | 12 | 1 | 2.4 |
| 72 | 70 | 30 | | 65 | 800 | 72 | nb | 12 | 8 | 0 | 1.5 |
| 73 | 90 | | 10 | 65 | 802 | 73 | nb | 12 | 12 | 2 | 3.1 |
| Ionomer resin is a dryblend of 8000/7010 50/50 | | | | | | | | | | | |
| 74 | 100 | 0 | | 68 | 803 | 71 | nb | 12 | 12 | 4 | 6.2 |
| 75 | 90 | 10 | | 66 | 803 | 72 | nb | 12 | 12 | 11 | 5 |
| 76 | 80 | 20 | | 64 | 803 | 74 | nb | 12 | 12 | 2 | 3.9 |
| 77 | 70 | 30 | | 65 | 801 | 74 | nb | 12 | 12 | 1 | 2.1 |
| 78 | 90 | | 10 | 66 | 803 | 73 | nb | 12 | 11 | 4 | 5.1 |
| Ionomer resin is a dryblend of 1006/1007 50/50 | | | | | | | | | | | |
| 79 | 100 | 0 | | 68 | 802 | 71 | nb | 12 | 12 | 4 | 6.7 |
| 80 | 90 | 10 | | 67 | 800 | 71 | nb | 12 | 12 | 3 | 5.2 |
| 81 | 80 | 20 | | 66 | 801 | 73 | nb | 12 | 12 | 4 | 3.5 |
| 82 | 70 | 30 | | 65 | 798 | 74 | nb | 12 | 11 | 1 | 2 |
| 83 | 90 | | 10 | 67 | 802 | 75 | nb | 12 | 11 | 7 | 5.2 |

| Ex. # | % Ionomer | % 8351 | % 8202 | Riehle | C.O.R. | Shore D | Cold Crack | 100[1] blows | 200[2] blows | 300[3] blows | MI |
|---|---|---|---|---|---|---|---|---|---|---|---|
| Ionomer Resin is a dryblend of 1002/1003 50/50 | | | | | | | | | | | |
| 84 | 100 | 0 | | 65 | 805 | 71 | nb | 12 | 12 | 2 | 11.2 |
| 85 | 90 | 10 | | 65 | 805 | 72 | nb | 12 | 11 | 3 | 7.4 |
| 86 | 80 | 20 | | 64 | 804 | 73 | nb | 12 | 10 | 0 | 4.6 |
| 87 | 70 | 30 | | 67 | 810 | 75 | 1 @ 5th blow | 12 | 4 | 0 | 2.8 |
| 88 | 90 | | 10 | 66 | 815 | 75 | nb | 12 | 12 | 0 | 5 |
| Ionomer resin is a dryblend of AD8195/AD8444 50/50 | | | | | | | | | | | |
| 89 | 100 | 0 | | 66 | 818 | 72 | nb | 12 | 12 | 0 | 13.8 |
| 90 | 90 | 10 | | 65 | 816 | 73 | nb | 12 | 12 | 1 | 10 |
| 91 | 80 | 20 | | 65 | 815 | 74 | nb | 12 | 9 | 1 | 7.2 |
| 92 | 70 | 30 | | 64 | 813 | 75 | nb | 12 | 11 | 0 | 8.1 |
| Ionomer resin is a dryblend of AD8195/AD8181 50/50 | | | | | | | | | | | |
| 93 | 100 | 0 | | 66 | 815 | 73 | nb | 12 | 12 | 0 | 6.3 |
| 94 | 490 | 10 | | 67 | 817 | 74 | nb | 12 | 9 | 0 | 4.3 |

TABLE 21-continued

| Ex. # | % Ionomer | % 8351 | % 8202 | COMP | C.O.R. | Shore D | Cold Crack | 100[1] blows | 200[2] blows | 300[3] blows | MI |
|---|---|---|---|---|---|---|---|---|---|---|---|
| 95 | 80 | 20 | | 66 | 814 | 74 | nb | 12 | 7 | 0 | 4.3 |
| 96 | 70 | 30 | | 64 | 812 | 75 | nb | 12 | 4 | 0 | 2.3 |

IOTEK 8000 16% AA Na Precursor 37MI
IOTEK 7010 15% AA Zn Precursor 37MI
IOTEK 1006 15% AA Na Precursor 20MI
IOTEK 1007 15% AA Zn Precursor 20MI
IOTEK 1002 18% AA Na Precursor 28MI
IOTEK 1003 18% AA Zn Precursor 28MI
AD8195 Zn
AD8444 Za
AD8181 Li
[1]Number of balls out of 2 which survived 100 blows
[2]Number of balls out of 2 which survived 200 blows
[3]Number of balls out of 2 which survived 300 blows

EXAMPLES 97–143

Tensile Data for Ionomers and Nylon-Ionomer Blends

Tensile data was collected for a number of blends of ionomer and nylon. The results are shown on Table 22. The addition of nylon generally increased tensile modulus and energy to break.

TABLE 22

| Ex. # | Ionomer | Nylon Type | % Nylon | Break Stress PSI | % Strain @ Break | Energy to Break 1h-Lb | Yield Stress PSI | % Strain @ Yield | Modulus[1] PSI |
|---|---|---|---|---|---|---|---|---|---|
| 97 | 8000/7010 (75/25) | — | 0 | 3666 | 211.3 | 58.8 | 3203 | 20.7 | 26825 |
| 98 | " | 8351 | 10 | 3834 | 224.3 | 65.9 | 3314 | 21.4 | 27723 |
| 99 | " | 8351 | 20 | 3985 | 217.8 | 67 | 3483 | 22.1 | 28777 |
| 100 | " | 8351 | 30 | 4158 | 220 | 70.8 | 3659 | 24.9 | 30363 |
| 101 | " | 8202 | 10 | 3751 | 211.8 | 62 | 3412 | 21.6 | 27254 |
| 102 | 8000/7010 (50/50) | — | 0 | 3496 | 232.5 | 62 | 3151 | 20.1 | 25930 |
| 103 | " | 8351 | 10 | 3635 | 241.6 | 67.3 | 3196 | 20.1 | 26196 |
| 104 | " | 8351 | 20 | 3869 | 265.1 | 76 | 3193 | 20.2 | 26920 |
| 105 | " | 8351 | 30 | 4075 | 257.5 | 77.8 | 3355 | 21.8 | 26928 |
| 106 | " | 8202 | 10 | 3684 | 248.2 | 69.1 | 3179 | 20.9 | 25584 |
| 107 | 1006/1007 (50/50) | — | 0 | 3551 | 239.6 | 66.1 | 3162 | 19.9 | 26335 |
| 108 | " | 8351 | 10 | 3677 | 252.8 | 71.4 | 3125 | 20.4 | 26070 |
| 109 | " | 8351 | 20 | 3995 | 254.5 | 76.2 | 3320 | 20.7 | 27938 |
| 110 | " | 8351 | 30 | 4056 | 246.1 | 75.7 | 3389 | 22 | 29071 |
| 111 | " | 8202 | 10 | 3556 | 234.8 | 65.7 | 3207 | 19.8 | 27561 |
| 112 | 1002/1003 (50/50) | — | 0 | 3759 | 251.8 | 72.5 | 3586 | 18.1 | 30593 |
| 113 | " | 8351 | 10 | 4007 | 276.4 | 81.5 | 3530 | 18.4 | 30491 |
| 114 | " | 8351 | 20 | 4107 | 277.4 | 84 | 3551 | 18.8 | 30589 |
| 115 | " | 8351 | 30 | 4305 | 277.3 | 87.7 | 3683 | 18.1 | 30671 |
| 116 | 1002/1003 (50/50) | 8202 | 10 | 4481 | 317.2 | 99.8 | 3675 | 17.8 | 32585 |
| 117 | — | 8351 | 100 | 8927 | 478.8 | 255.1 | 5085 | 25.8 | 56670 |
| 118 | | 8351 | 100 | 8312 | 500.4 | 247.2 | 4785 | 27.5 | 42281 |
| 119 | BX1 | 8351 | 40 | 5323 | 293 | 106.2 | 3606 | 20.6 | 30198 |
| 120 | BX1 | 8351 | 20 | 4584 | 265 | 81.8 | 3293 | 19.5 | 28032 |
| 121 | BX1 | | 0 | 3907 | 216.9 | 62.8 | 3305 | 21.6 | 26094 |
| 122 | | 8202 | 100 | 8434 | 422.4 | 248 | 7064 | 19.8 | 63744 |
| 123 | BX1 | 8202 | 80 | 9223 | 518.9 | 288.8 | 5973 | 17.8 | 58195 |
| 124 | BX1 | 8202 | 60 | 7920 | 484 | 238.3 | 5510 | 18.9 | 58424 |
| 125 | BX1 | 8202 | 40 | 6072 | 397.6 | 158.5 | 4771 | 18.1 | 45577 |
| 128 | BX1 | 8202 | 20 | 4538 | 281.4 | 96.4 | 4090 | 20.7 | 35404 |
| 127 | BX1 | | 0 | 3907 | 216.9 | 62.8 | 3305 | 21.6 | 26094 |
| 128 | BX2 | | 0 | 3489 | 217.2 | 61.8 | 3603 | 19.2 | 29755 |
| 129 | BX2 | 8351 | 20 | 3732 | 245.8 | 71.3 | 3540 | 19.5 | 29814 |
| 130 | BX2 | 8351 | 40 | 5465 | 352.6 | 125.2 | 3834 | 20.7 | 32862 |
| 131 | BX2 | 8351 | 80 | 7449 | 459.7 | 212 | 4408 | 34.4 | 37181 |
| 132 | BX2 | | 0 | 3489 | 217.2 | 61.8 | 3603 | 19.2 | 29755 |
| 133 | BX2 | 8202 | 20 | 4760 | 314.6 | 111.7 | 4462 | 18.3 | 37510 |
| 134 | BX2 | 8202 | 40 | 6484 | 422.4 | 174.4 | 4971 | 18.4 | 44209 |
| 135 | BX2 | 8202 | 60 | 7202 | 456.6 | 214.4 | 5288 | 21.3 | 49705 |
| 136 | BX3 | | 0 | 3847 | 184.2 | 55.3 | 3866 | 19.5 | 31580 |
| 137 | BX3 | 8351 | 20 | 4010 | 231.7 | 72.2 | 3864 | 19.6 | 32011 |
| 138 | BX3 | 8351 | 40 | 5342 | 327.2 | 118.2 | 4058 | 22.5 | 32499 |

TABLE 22-continued

| Ex. # | Ionomer | Nylon Type | % Nylon | Break Stress PSI | % Strain @ Break | Energy to Break 1h-Lb | Yield Stress PSI | % Strain @ Yield | Modulus[1] PSI |
|---|---|---|---|---|---|---|---|---|---|
| 139 | BX3 | 8351 | 60 | 7266 | 454.5 | 211.2 | 4695 | 27.8 | 43427 |
| 140 | BX3 |  | 0 | 3647 | 184.2 | 55.3 | 3866 | 19.5 | 31580 |
| 141 | BX3 | 8202 | 20 | 4820 | 323.8 | 105.5 | 3768 | 18.2 | 32422 |
| 142 | BX3 | 8202 | 40 | 6341 | 448.2 | 177.2 | 4236 | 17.4 | 40094 |
| 143 | BX3 | 8202 | 80 | 7910 | 486.9 | 232.7 | 5154 | 20.1 | 50535 |

[1] tensile modulus

Examples 144–150

Various coverstock blends were formed using a blend of AMODEL ET-1001 or AMODEL AT-1001 polyphthalamide with ionomer resin such as SURLYN 8140 and SURLYN 6120.

As shown by the results on Table 23, blends of polyphthalamide with ionomers showed good durability. Particularly, Examples 144 and 148 show golf ball compositions with a high durability. Also, Examples 144–150 exhibited high C.O.R. values.

Examples 151–174

A variety of cover blends were formed using AMODEL AT-1001 and/or AMODEL ET-1001 polyphthalamide with ionomer resin such as EX1002, EX1003, EX5091, and EX5092. The particular blend amounts of each material is shown in Table 24.

TABLE 23

|  | Example | | | | | | |
|---|---|---|---|---|---|---|---|
|  | 144 | 145 | 146 | 147 | 148 | 149 | 150 |
| Amodel ET-1001 (grams) | 600 | 900 | 1200 |  |  |  |  |
| Amodel AT-1001 (grams) |  |  |  | 600 | 900 | 1200 |  |
| Surlyn 8140 (grams) | 1050 | 900 | 750 | 1050 | 900 | 750 | 1350 |
| Surlyn 6120 (grams) | 1050 | 900 | 750 | 1050 | 900 | 750 | 1350 |
| TGMB 2832 (grams) | 300 | 300 | 300 | 300 | 300 | 300 | 300 |
| AS MOLDED | | | | | | | |
| Size inches | 1.679 | 1.68 | 1.68 | 1.68 | 1.68 | 1.681 | 1.681 |
| Weight (grams) | 45.5 | 45.64 | 45.91 | 45.45 | 45.58 | 45.77 | 45.23 |
| Riehle Compression | 67 | 65 | 63 | 67 | 66 | 64 | 70.5 |
| C.O.R. | 0.815 | 0.8138 | 0.8123 | 0.8162 | 0.8147 | 0.8118 | 0.8152 |
| SD Coefficient | 0.0008 | 0.0012 | 0.0022 | 0.0013 | 0.0009 | 0.0012 | 0.0009 |
| Barrel to Destruction (average number of hits to failure) | 873.67 | 369.8 | 148.25 | 552.92 | 620.5 | 496.67 | 328.08 |
| FINISHED | | | | | | | |
| Size (inches) | 1.681 | 1.681 | 1.681 | 1.68 | 1.681 | 1.682 | 1.681 |
| Weight (grams) | 45.62 | 45.76 | 46.04 | 45.5 | 45.72 | 45.89 | 45.32 |
| Riehle Compression | 63 | 61 | 59 | 64 | 63 | 62 | 66 |
| C.O.R. | 0.8186 | 0.817 | 0.816 | 0.819 | 0.8184 | 0.8147 | 0.8203 |
| SD Coefficient | 0.0005 | 0.0015 | 0.0013 | 0.001 | 0.0009 | 0.0016 | 0.0008 |
| Shore D | 74 | 76 | 78 | 74 | 75 | 74 | 72 |
| Cold Crack | 1 @ 5 | No Failures | 10 @ 2<br>2 @ 5 | No Failures | No Failures | 3 @ 2<br>3 @ 3<br>2 @ 5 | No Failures |

TABLE 24

| Example | 151 | 152 | 153 | 154 | 155 | 156 | 157 | 158 | 159 | 160 | 161 | 162 |
|---|---|---|---|---|---|---|---|---|---|---|---|---|
| Amodel AT 1001 | 800 g | 1200 g | 1600 g |  |  |  | 800 g | 1200 g | 1600 g |  |  |  |
| Amodel ET 101 |  |  |  | 800 g | 1200 g | 1600 g |  |  |  | 800 g | 1200 g | 1600 g |
| EX 1002 | 994 g | 854 g | 714 g | 994 g | 854 g | 714 g | 1420 g | 1220 g | 1020 g | 1420 g | 1220 g | 1020 g |
| EX 1003 | 1846 g | 1586 g | 1326 g | 1846 g | 1586 g | 1326 g | 1420 g | 1220 g | 1020 g | 1420 g | 1220 g | 1020 g |
| TGMB | 360 g | 360 g | 360 g | 360 g | 360 g | 360 g | 360 g | 360 g | 360 g | 360 g | 360 g | 360 g |
| Amodel Ionomer | 20/(35/65) | 30/(35/65) | 40/(35/65) | 20/(35/65) | 30/(35/65) | 40/(35/65) | 20/(50/50) | 30/(50/50) | 40/(50/50) | 20/(50/50) | 30/(50/50) | 40/(50/50) |
| Example | 163 | 164 | 165 | 166 | 167 | 168 | 169 | 170 | 171 | 172 | 173 | 174 |

TABLE 24-continued

| | | | | | | | | | | | | |
|---|---|---|---|---|---|---|---|---|---|---|---|---|
| Amodel AT 1001 | 800 g | 1200 g | 1600 g | | | | 800 g | 1200 g | 1600 g | | | |
| Amodel ET 1001 | | | | 800 g | 1200 g | 1600 g | | | | 800 g | 1200 g | 1600 g |
| EX 5091 | 994 g | 854 g | 714 g | 994 g | 854 g | 714 g | 1420 g | 1220 g | 1020 g | 1420 g | 1220 g | 1020 g |
| EX 5092 | 1846 g | 1586 g | 1326 g | 1846 g | 1586 g | 1326 g | 1420 g | 1220 g | 1020 g | 1420 g | 1220 g | 1020 g |
| TGMB | 360 g | 360 g | 360 g | 360 g | 360 g | 360 g | 360 g | 360 g | 360 g | 360 g | 360 g | 360 g |
| Amodel Ionomer | 20/ (35/65) | 30/ (35/65) | 40/ (35/65) | 20/ (35/65) | 30/ (35/65) | 40/ (35/65) | 20/ (50/50) | 30/ (50/50) | 40/ (50/50) | 20/ (50/50) | 30/ (50/50) | 40/ (50/50) |

Example 175

A golf ball having the same coverstock blend as the ball found in Example 153 was placed through a series of tests to determine coefficient of restitution, cold crack resistance, Barrel durability, $S_D$ coefficient, and Riehle compression. The results of the golf ball tests are shown on Table 25 and are compared to the results found in the commercially available STRATA golf ball from Spalding Sports Worldwide, Inc., which serves here as the control.

TABLE 25

| | STRATA CONTROL | EXAMPLE 175 |
|---|---|---|
| Finished | | |
| Size | 1.681" | 1.679" |
| Weight | 45.53 g | 45.53 g |
| Riehle | 81 | 81 |
| COR | .7839 | .7855 |
| $S_D$COR | .0016 | .0023 |
| Cold Crack | 1 @ 2 | No failures |
| | 1 @ 3 | |
| | 1 @ 4 | |
| As Molded | | |
| Size | 1.680" | 1.679" |
| Weight | 45.42 g | 45.44 g |
| Riehle | 85 | 84 |
| COR | .7842 | .7857 |
| $S_D$COR | .0024 | .0023 |
| Barrel: | No failures | No failures |

In any of the compositions employed in the invention, additional materials may be added to these compositions employed to provide desired properties. These materials include, for example, dyes such as Ultramarine™ sold by Witaker, Clark and Daniels of South Plainfield, N.J., titanium dioxide, UV absorbers and stabilizers. The compositions also may include softening agents such as plasticizers and reinforcing materials such as glass fibers and inorganic fillers. Antioxidants also may be included in the compositions of the invention, conventionally in amounts of about 1% by weight. Useful antioxidants include 4,4'-di (1,1,3,3-tetramethylbutyl) diphenylamine sold under the trade designation "Octamine Antioxidant" by Naugatuck Division of US Rubber. Also useful is the hydroperoxide decomposer antidegradant tetrakis (2,4-ditertbutylphenyl)-4,4'-biphenylenediphosphonite sold under the trade designation "Sandostab P-EPQ" by Sandoz Colors & Chemicals Co.

The compositions employed in the invention may be prepared by any conventional procedure that provides a substantially uniform admixture of the components. Preferably drying and melt blending procedures and equipment are used. For example, in preparation of compositions which employ nylon materials such as RP with one or more terpolymers and/or terpolymer ionomers, the terpolymer and/or terpolymer ionomer can be dry mixed with RP, typically at room temperature, and the resulting mixture melt blended in any conventional type blending equipment heated to about 200–250° C. The nylon material and the copolymer, terpolymer, terpolymer ionomer, and/or copolymer ionomer preferably are dried (either individually or together) before melt blending. Drying is done in desiccated air at a temperature and for a time suitable to reduce the moisture content to a point which it will not have any adverse effect on the subsequent use of the compositions or the properties of the resulting product. If additives such as those identified above have not previously been added to either the nylon material, the copolymer or copolymer ionomer during processing of those individual components, i.e., before they are admixed with each other, the additives may be added during melt blending of those components. The uniform admixture resulting from the melt blending procedure then may be commuted by chopping, pelletizing or grinding into granules, pellets, chips, flakes or powders suitable for subsequent use, e.g. injection molding to provide a golf ball.

The invention has been described with reference to the preferred embodiments. Modification and alterations will occur to others upon reading and understanding the preceding detailed description. It is intended that the invention be construed as including all such alterations and modifications insofar as they come within the scope of the claims and the equivalents thereof.

What is claimed is:

1. A golf ball comprising a cover and a core centrally disposed within said cover, wherein at least one of said core and said cover includes a composition blend comprising a polyamide-ionomer graft copolymer and an ionomer, wherein said polyamide-ionomer copolymer includes from about 30% to about 95% of a polyamide component and from about 70% to about 5% of an ionomeric component.

2. The golf ball according to claim 1, wherein said polyamide-ionomer graft copolymer comprises an ionomeric component grafted to a polyamide component.

3. The golf ball according to claim 1, wherein said composition includes from about 20% to about 90% by weight of said polyamide-ionomer graft copolymer and from about 80% to about 10% by weight of said ionomer.

4. The golf ball according to claim 1, wherein said golf ball exhibits a coefficient of restitution of at least 0.750.

5. The golf ball according to claim 1, wherein said golf ball exhibits a Rhiele compression of less than 75.

6. The golf ball according to claim 2, wherein said polyamide component is a polyamide polymer selected from the group consisting of polyphthalamide, polyisophthalamide, polyterephthalamide, polycaprolactam (nylon 6), polyhexamethyleneadipimide (nylon 6,6), polyhexamethyleneisophthalamide, polyhexamethylenedodecanediamide (nylon 6,12), nylon 11, nylon 12, nylon 46, nylon 6,10, nylon 6,6,6, nylon 6/12, nylon 6,6/12, and nylon 6/6,10, and combinations thereof; and said ionomeric component is an ionomeric copolymer comprising an alpha-olefin having 2 to 8 carbon atoms, and an alpha, beta-ethylenically unsaturated carboxylic acid having at least about 3% of the carboxylic acid groups neutralized.

7. The golf ball according to claim 6, wherein said polyamide component is selected from the group consisting of polyphthalamide, polyisophthalamide, polycaprolactam (nylon 6), and combinations thereof, said alpha-olefin is ethylene, said alpha, beta-ethylenically unsaturated carboxylic acid is selected from the group consisting of acrylic acid, methacrylic acid, fumaric acid, itaconic acid, crotonic acid, maleic acid, maleic anhydride, o-chloroacrylic acid, and combinations thereof, and said carboxylic acid groups are neutralized with a metal ion selected from the group consisting of zinc, magnesium, lithium, and combinations thereof.

8. The golf ball according to claim 7, wherein said alpha, beta-ethylenically unsaturated carboxylic acid is selected from the group consisting of acrylic acid, methacrylic acid, and combinations thereof, and said metal ion is zinc.

9. The golf ball of claim 1 wherein said ionomer comprises an alpha-olefin having 2–8 carbon atoms, and an alpha, beta-ethylenically unsaturated carboxylic acid having at least about 3% of the carboxylic acid groups neutralized.

10. The golf ball according to claim 1, wherein said core includes a composition blend comprising a polyamide-ionomer graft copolymer and an ionomer.

11. The golf ball according to claim 1, wherein said cover includes a composition blend comprising a polyamide-ionomer graft copolymer and an ionomer.

12. A method of making a golf ball, said method comprising the steps of:

obtaining a golf ball core; and forming a cover layer over said core, wherein at least one of said core and said cover comprises a composition blend, said composition blend comprising a polyamide-ionomer graft copolymer and an ionomer, wherein said copolymer includes from about 30% to about 95% of a polyamide component and from about 70% to about 5% of an ionomeric component.

* * * * *